US010359105B2

(12) United States Patent
Miyake

(10) Patent No.: US 10,359,105 B2
(45) Date of Patent: Jul. 23, 2019

(54) ELECTRIC POWER STEERING DEVICE

(71) Applicant: NSK LTD., Tokyo (JP)

(72) Inventor: Masaki Miyake, Maebashi (JP)

(73) Assignee: NSK LTD., Tokyo (JP)

( * ) Notice: Subject to any disclaimer, the term of this patent is extended or adjusted under 35 U.S.C. 154(b) by 213 days.

(21) Appl. No.: 15/525,222

(22) PCT Filed: Dec. 14, 2015

(86) PCT No.: PCT/JP2015/084908
§ 371 (c)(1),
(2) Date: May 8, 2017

(87) PCT Pub. No.: WO2016/098721
PCT Pub. Date: Jun. 23, 2016

(65) Prior Publication Data
US 2017/0328462 A1    Nov. 16, 2017

(30) Foreign Application Priority Data
Dec. 15, 2014    (JP) .................................. 2014-252881

(51) Int. Cl.
*F16H 55/24*    (2006.01)
*B62D 5/04*    (2006.01)
*B32B 7/02*    (2019.01)

(52) U.S. Cl.
CPC .............. *F16H 55/24* (2013.01); *B62D 5/04* (2013.01); *B62D 5/0409* (2013.01);
(Continued)

(58) Field of Classification Search
CPC ...... B62D 5/04; B62D 5/0409; B62D 5/0454; B62D 5/0421; F16H 55/24
(Continued)

(56) References Cited

U.S. PATENT DOCUMENTS 6,408,707 B1 * 6/2002 Kimura ................ B62D 5/0409
74/388 PS
6,457,870 B2 * 10/2002 Aizawa ................ F16C 19/388
384/477

(Continued)

FOREIGN PATENT DOCUMENTS

CN    1784332 A    6/2006
CN    102416977 A    4/2012
(Continued)

OTHER PUBLICATIONS

Communication issued by the Japanese Patent Office dated Nov. 21, 2017 in counterpart Japanese Patent Application No. 2016-564838.
(Continued)

*Primary Examiner* — Anne Marie M Boehler
(74) *Attorney, Agent, or Firm* — Sughrue Mion, PLLC

(57) ABSTRACT

An electric power steering device includes a composite metal member. The composite metal member is formed by laminating a plurality of metal plates that have different thermal expansion coefficients. The composite metal member is capable of causing a worm shaft to oscillate and be displaced away from a worm wheel on the basis of deformation of the composite metal member if the temperature thereof has become higher than a reference temperature. The composite metal member is also capable of causing the worm shaft to oscillate and be displaced towards the worm wheel on the basis of deformation of the composite metal member if the temperature thereof has become lower than the reference temperature.

9 Claims, 17 Drawing Sheets

(52) U.S. Cl.
CPC .............. B62D 5/0454 (2013.01); *B32B 7/02* (2013.01); *B62D 5/0421* (2013.01)

(58) Field of Classification Search
USPC ........................................................ 180/444
See application file for complete search history.

(56) References Cited

U.S. PATENT DOCUMENTS

| | | | | |
|---|---|---|---|---|
| 2003/0089195 | A1* | 5/2003 | Neubauer | F02N 15/046 74/640 |
| 2005/0121251 | A1 | 6/2005 | Ueno et al. | |
| 2006/0169528 | A1* | 8/2006 | Yuasa | B62D 5/0409 180/444 |
| 2012/0073897 | A1 | 3/2012 | Ohnishi et al. | |
| 2013/0206498 | A1 | 8/2013 | Froehlich | |
| 2016/0031473 | A1* | 2/2016 | Riepold | B62D 5/0409 74/425 |

FOREIGN PATENT DOCUMENTS

| | | | |
|---|---|---|---|
| CN | 102939468 | A | 2/2013 |
| EP | 2345568 | A1 | 7/2011 |
| JP | 58-140031 | U | 9/1983 |
| JP | 63-174144 | U | 11/1988 |
| JP | 6-96650 | A | 4/1994 |
| JP | 2002-98198 | A | 4/2002 |
| JP | 2003-74676 | A | 3/2003 |
| JP | 2013056578 | * | 3/2003 |
| JP | 2005138610 | * | 1/2005 |
| JP | 2005-138610 | A | 6/2005 |
| JP | 2006-27309 | A | 2/2006 |
| JP | 2006-44449 | A | 2/2006 |
| JP | 2007-203947 | A | 8/2007 |
| JP | 2010-247783 | A | 11/2010 |
| JP | 2011-94763 | A | 5/2011 |
| JP | 2014-77639 | A | 5/2014 |
| JP | 2016-28931 | A | 3/2016 |
| KR | 10-2008-0000730 | A | 1/2008 |
| KR | 20080000730 | * | 1/2008 |

OTHER PUBLICATIONS

Communication dated Jul. 27, 2018, from the State Intellectual Property Office of People's Republic of China in counterpart Application No. 201580065007.4.
Extended European Research Report dated Nov. 29, 2017, by the European Patent Office in counterpart European Application No. 15869926.4.
Communication dated May 1, 2018 issued by the Japanese Patent Office in counterpart Japanese Patent Application No. 2014-222605.
Communication dated May 8, 2018 issued by the Japanese Patent Office in counterpart Japanese Patent Application No. 2016-564838.
Search Report dated Mar. 8, 2016, issued by the International Searching Authority in counterpart International Patent Application No. PCT/JP2015/084908 (PCT/ISA/210).
Written Opinion dated Mar. 8, 2016, issued by the International Searching Authority in counterpart International Patent Application No. PCT/JP2015/084908 (PCT/ISA/237).

* cited by examiner

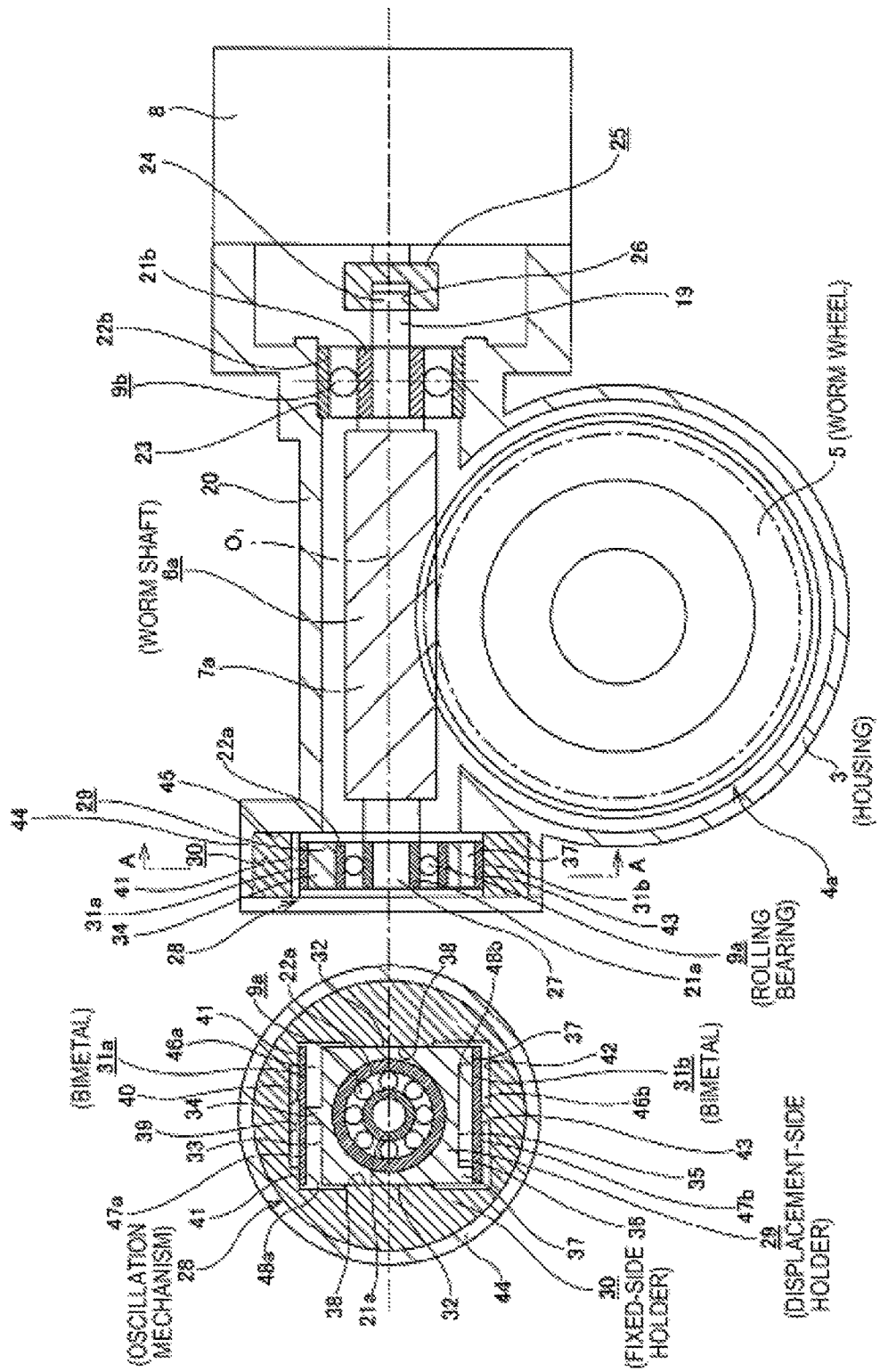

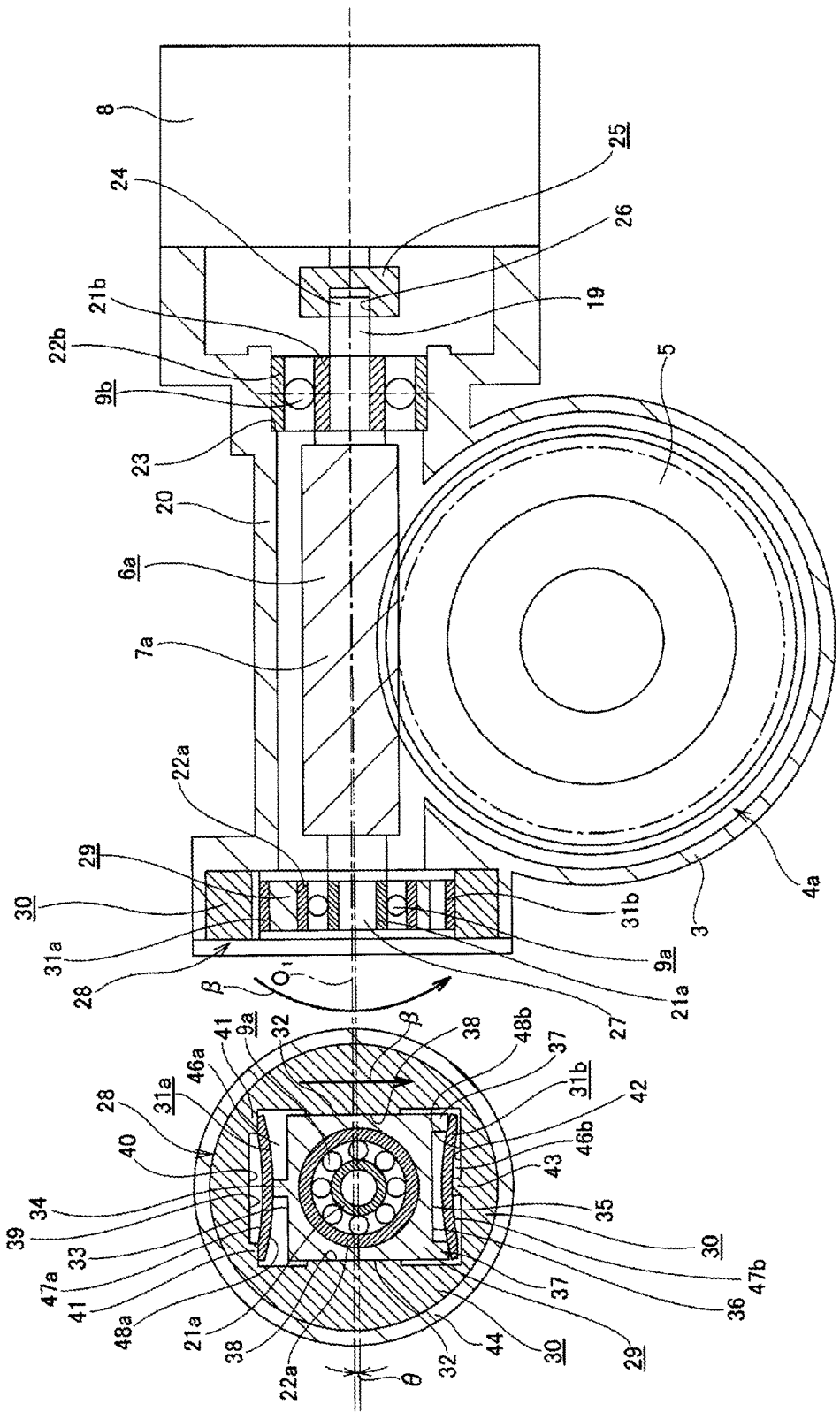

ELECTRIC POWER STEERING DEVICE

TECHNICAL FIELD

An electric power steering device of the present invention is to be incorporated into a steering device of an automobile and is to use an electric motor as an auxiliary power, thereby reducing a force necessary for a driver to operate a steering wheel.

RELATED ART

When applying a steering angle to steered wheels (generally, front wheels except for a special vehicle such as a forklift), a power steering device has been widely used as a device for reducing a force necessary for a driver to operate a steering wheel. Also, regarding the power steering device, an electric power steering device configured to use an electric motor as an auxiliary power source has also been recently spread. The electric power steering device has merits that it can be made smaller and lighter and can easily control a magnitude (torque) of auxiliary power and a power loss of an engine is less, as compared to a hydraulic power steering device.

Regarding a structure of the electric power steering device, a variety of structures have been known. However, in any structure, a rotary shaft configured to rotate in accordance with an operation of the steering wheel and to apply a steering angle to the steered wheels by the rotation is applied with the auxiliary power of the electric motor via a decelerator. As the decelerator, a worm decelerator has been generally used. In the case of the electric power steering device using the worm decelerator, a worm configured to rotate by the electric motor and a worm wheel configured to rotate together with the rotary shaft are meshed with each other so that the auxiliary power of the electric motor can be freely transmitted to the rotary shaft.

For example, Patent Document 1 discloses an electric power steering device as shown in FIGS. 15 and 16. A front end portion of a steering shaft (rotary shaft) 2 configured to rotate in a predetermined direction by a steering wheel 1 is rotatably supported within a housing 3, and a worm wheel 5 configuring a worm decelerator 4 is fixed to the corresponding part. Worm teeth 7, which are formed on an axially intermediate part of a worm shaft 6 configuring the worm decelerator 4 (unless otherwise mentioned, an axial direction, a radial direction and a circumferential direction in the specification and the claims indicate respective directions with respect to the worm shaft), are configured to mesh with the worm wheel 5. The worm shaft 6 is configured to rotate by an electric motor 8. Both end portions of the worm shaft 6 are rotatably supported in the housing 3 by a pair of rolling bearings 9a, 9b such as deep groove ball bearings or the like. At this state, the worm wheel 5 and the worm teeth 7 are meshed, so that auxiliary power of the electric motor 8 can be transmitted to the worm shaft 6.

The structure of the electric power steering device is described in more detail with reference to FIG. 17. The worm wheel 5 is externally fitted and fixed to a rotary shaft 10, which is an output part of the electric power steering device, between a pair of rolling bearings 11a, 11b by interference fit or the like and is configured to rotate together with the rotary shaft 10. The rotary shaft 10 is coupled with the front end portion of the steering shaft 2 by a torsion bar 12 at a state with being supported in the housing 3 by both the rolling bearing 11a, 11b only to be freely rotatable. The electric motor 8 (refer to FIGS. 15 and 16) is configured to rotate the worm shaft 6 in accordance with a direction and a magnitude of torque that is to be detected by a torque sensor 13 and to be applied to the steering shaft 2, thereby applying auxiliary torque to the rotary shaft 10. The rotation of the rotary shaft 10 is transmitted to an input shaft 17 (refer to FIG. 15) of a steering gear unit 16 via a pair of universal joints 14a, 14b and an intermediate shaft 15, thereby applying a desired steering angle to the steered wheels.

According to the above-described electric power steering device that has been generally used, the worm decelerator 4 has inevitable backlash due to size errors, mounting errors and the like of the worm wheel 5, the worm shaft 6, bearings for supporting the respective members 5, 6 and the like, which are constitutional members of the worm decelerator 4. When the backlash increases, the teeth of the worm wheel 5 and the worm shaft 6 strongly strike each other, so that a jagged gear-tooth striking sound may be generated.

Therefore, according to the conventional structure as described above, the worm teeth 7 of the worm shaft 6 are pressed toward the worm wheel 5 by an elasticity applying means 18 provided at a tip portion (a right end portion in FIG. 16) of the worm shaft 6. In the meantime, since a structure of the elasticity applying means 18 is described in detail in Patent Document 2 and the like, for example, the specific description thereof is omitted.

According to the conventional structure as described above, it is possible to suppress the backlash between the worm shaft 6 and the worm wheel 5 and to suppress the generation of the gear-tooth striking sound by the elasticity applying means 18.

However, according to the conventional structure as described above, since the worm wheel 5 expands or contracts due to a change in temperature upon the using, a backlash amount of the meshing part between the worm wheel 5 and the worm teeth 7 of the worm shaft 6 is changed.

CITATION LIST

Patent Documents

Patent Document 1: Japanese Patent Application Publication No. 2011-94763A
Patent Document 2: Japanese Patent Application Publication No. 2007-203947A

SUMMARY OF THE INVENTION

Problems to be Solved

The present invention has been made in view of the above problems, and an object of the present invention is to implement a structure capable of keeping backlash of a meshing part between worm teeth configuring a worm shaft and a worm wheel to an appropriate magnitude, irrespective of expansion and contraction of the worm wheel.

Means for Solving the Problems

An electric power steering device of the present invention has a housing, a rotary shaft for steering, a worm wheel, a worm shaft and an electric motor.

The housing is fixed to a fixed part such as a vehicle body and does not rotate.

The rotary shaft for steering is rotatably provided to the housing and is configured to rotate in accordance with an operation of a steering wheel and to apply a steering angle to steered wheels by the rotation.

The worm wheel is supported to a part of the rotary shaft for steering concentrically with the rotary shaft for steering within the housing and is configured to rotate together with the rotary shaft for steering.

The worm shaft has worm teeth provided on an axially intermediate part. The worm shaft of which parts (for example, both axial end portions) except for the worm teeth is rotatably supported to the housing by bearings with the worm teeth being meshed with the worm wheel.

The electric motor is provided to rotate the worm shaft.

In particular, the electric power steering device of the present invention includes a composite metal member (for example, bimetal). The composite metal member is formed by laminating a plurality of metal plates having different thermal expansion coefficients. The composite metal member is capable of causing the worm shaft to oscillate and be displaced away from the worm wheel on the basis of deformation of the composite metal member when a temperature thereof becomes higher than a reference temperature. The composite metal member is capable of causing the worm shaft to oscillate and be displaced toward the worm wheel on the basis of deformation of the composite metal member when the temperature thereof becomes lower than the reference temperature.

In the meantime, the reference temperature is a temperature when switching an oscillation direction of the worm shaft so as to adjust a backlash amount of a meshing part between the worm teeth of the worm shaft and the worm wheel and is a value that is to be appropriately set by a relation between a temperature at an operating state and a thermal expansion coefficient of the worm wheel, for example. Also, a shape (whether or not deformation) of the composite metal member at the reference temperature is not particularly limited.

Also, when implementing the present invention, following configurations are also possible.

The two composite metal members are held at radially opposite parts of the worm shaft by a holder.

Also, the composite metal member of the two composite metal members, which is close to the worm wheel, is configured to cause the worm shaft to oscillate and be displaced away from the worm wheel on the basis of deformation of the composite metal member when a temperature thereof becomes higher than the reference temperature.

Further, the composite metal member of the two composite metal members, which is distant from the worm wheel, is configured to cause the worm shaft to oscillate and be displaced toward the worm wheel on the basis of deformation of the composite metal member when a temperature thereof becomes lower than the reference temperature.

Also, when implementing the present invention, following configurations are also possible.

When the composite metal member close to the worm wheel applies to the worm shaft one pressing force for causing the worm shaft to oscillate and be displaced away from the worm wheel, the composite metal member distant from the worm wheel may not apply to the worm shaft a pressing force of an opposite direction to the one pressing force.

On the other hand, when the composite metal member distant from the worm wheel applies to the worm shaft the other pressing force for causing the worm shaft to oscillate and be displaced toward the worm wheel, the composite metal member close to the worm wheel may not apply to the worm shaft a pressing force of an opposite direction to the other pressing force.

Also, when implementing the present invention, following configurations are also possible.

The holder is configured by a fixed-side holder and a displacement-side holder.

Also, the fixed-side holder is formed to have a cylinder shape and is supported and fixed so that an outer peripheral surface of the fixed-side holder is internally fitted to an inner peripheral surface of the housing.

Also, the displacement-side holder is formed to have a cylinder shape and is supported to a part of the worm shaft, which is inserted into an inner diameter-side part of the fixed-side holder.

The respective composite metal members are held at radially opposite parts between an inner peripheral surface of the fixed-side holder and an outer peripheral surface of the displacement-side holder.

Also, when implementing the present invention, a following configuration is also possible.

The oscillation and displacement of the displacement-side holder is guided by the fixed-side holder.

Also, when implementing the present invention, a following configuration is also possible.

The respective composite metal members are configured so that they are to be symmetrically deformed with respect to a central axis of the worm shaft.

Also, when implementing the present invention, a following configuration is also possible.

The respective composite metal members are configured so that they are to be deformed in the same direction.

Also, when implementing the present invention, following configurations are also possible.

A sectional shape of an inner surface of the fixed-side holder with respect to a virtual plane orthogonal to a central axis of the worm shaft is formed to have a rectangular shape.

Also, a sectional shape of an outer surface of the displacement-side holder with respect to the virtual plane is formed to have a rectangular shape.

Also, a pair of radially opposite inner surfaces of an inner surface of the fixed-side holder is respectively configured as a first fixed-side inner surface and a second fixed-side inner surface, and outer surfaces of the displacement-side holder facing the first and second fixed-side inner surfaces are configured as a first displacement-side outer surface and a second displacement-side outer surface.

Also, both end portions in a width direction of the first fixed-side inner surface are formed with a pair of first fixed-side convex portions.

Also, a central portion in a width direction of the second fixed-side inner surface is formed with a second fixed-side convex portion.

Also, a central portion in a width direction of the first displacement-side outer surface is formed with a first displacement-side convex portion.

Also, both end portions in a width direction of the second displacement-side outer surface are formed with a pair of second displacement-side convex portions.

Also, one of the respective composite metal members is disposed between the first fixed-side inner surface and the first displacement-side outer surface. Also, at this state, both end portions in the width direction of a side surface facing the fixed-side holder are in contact with tip surfaces of both the first fixed-side convex portions, and a central portion in the width direction of a side surface facing the displacement-side holder are in contact with a tip surface of the first displacement-side convex portion.

Further, the other composite metal member of the respective composite metal members is disposed between the second fixed-side inner surface and the second displacement-side outer surface. Also, the other composite metal member is disposed at a state where a central portion in the width direction of a side surface facing the fixed-side holder is in contact with a tip surface of the second fixed-side convex portion and both end portions in the width direction of a side surface facing the displacement-side holder are in contact with tip surfaces of both the second displacement-side convex portions.

Also, the electric power steering device of the present invention may further have a pressing member.

The pressing member is provided to press the worm shaft toward the worm wheel.

In particular, the electric power steering device of the present invention has a composite metal member, which is formed by laminating a plurality of metal plates having different thermal expansion coefficients, between an end portion of both end portions of the pressing member, which is opposite to the worm shaft, and the inner peripheral surface of the housing.

The above composite metal member can be deformed in a direction of suppressing a magnitude of a pressing force, by which the pressing member is to press the worm shaft toward the worm wheel, from increasing when a temperature thereof becomes higher than the reference temperature. On the other hand, the above composite metal member can be deformed in a direction of suppressing the magnitude of the pressing force, by which the pressing member is to press the worm shaft toward the worm wheel, from decreasing when the temperature thereof becomes lower than the reference temperature. In the meantime, the reference temperature can be set to a temperature at which the backlash amount of the meshing part between the worm teeth of the worm shaft and the worm wheel has an appropriate magnitude at a state where the pressing member presses the worm shaft toward the worm wheel. The reference temperature is a value that is to be appropriately set by a relation between a temperature at an operating state and a thermal expansion coefficient of the worm wheel, for example. Also, a shape (whether or not deformation) of the composite metal member at the reference temperature is not particularly limited.

When implementing the present invention, a configuration may be further adopted in which the composite metal member is deformed in a direction in which a position of an end portion of the pressing member opposite to the worm shaft is permitted to be displaced away from the worm shaft if the temperature thereof becomes higher than the reference temperature, as compared to a case where the temperature thereof is the reference temperature, and the composite metal member is deformed in a direction in which the position of the end portion of the pressing member opposite to the worm shaft is permitted to be displaced toward the worm shaft if the temperature thereof becomes lower than the reference temperature, as compared to the case where the temperature thereof is the reference temperature.

When implementing the present invention, a configuration may be further adopted in which the composite metal member and the pressing member are held by the holder.

In this case, a configuration may be further adopted in which the holder is configured by the fixed-side holder and the displacement-side holder.

When the above configurations are adopted, the fixed-side holder is formed to have a cylinder shape and is supported and fixed with the outer peripheral surface thereof being internally fitted to the inner peripheral surface of the housing.

Also, the displacement-side holder is formed to have a cylinder shape and is supported to the part of the worm shaft, which is inserted into the inner diameter-side part of the fixed-side holder.

Also, a configuration may be adopted in which the composite metal member and the pressing member are held between the inner peripheral surface of the fixed-side holder and the outer peripheral surface of the displacement-side holder.

In this case, a configuration may be further adopted in which the oscillation and displacement of the displacement-side holder is guided by the fixed-side holder.

Effects of the Invention

According to the present invention having the above configuration, it is possible to keep the backlash at the meshing part between the worm teeth configuring the worm shaft and the worm wheel to an appropriate magnitude, irrespective of the expansion and contraction of the worm wheel.

That is, the present invention provides the composite metal member that can cause the worm shaft to oscillate and be displaced away from the worm wheel when the temperature of the composite metal member becomes higher than the reference temperature and cause the worm shaft to oscillate and be displaced toward the worm wheel when the temperature of the composite metal member becomes lower than the reference temperature. For this reason, even when the worm wheel is thermally expanded or contracted in association with a change in temperature and the backlash amount of the meshing part is thus changed, it is possible to cause the worm shaft to oscillate and be displaced through the deformation of the composite metal member, thereby keeping the backlash of the meshing part to an appropriate magnitude.

Also, according to the present invention having the above configuration, it is possible to keep the pressing force, which is to press the worm shaft toward the worm wheel, to an appropriate magnitude, irrespective of the expansion and contraction of the worm wheel.

That is, the present invention provides the composite metal member that is to be deformed in a direction of suppressing the magnitude of the pressing force, by which the pressing member is to press the worm shaft toward the worm wheel, from increasing when a temperature thereof becomes higher than the reference temperature and that is to be deformed in a direction of suppressing the magnitude of the pressing force, by which the pressing member is to press the worm shaft toward the worm wheel, from decreasing when the temperature thereof becomes lower than the reference temperature. For this reason, even when the worm wheel is thermally expanded or contracted in association with a change in temperature, it is possible to keep the pressing force, by which the pressing member is to press the worm shaft toward the worm wheel, and the backlash of the meshing part between the worm shaft and the worm wheel to appropriate magnitudes. As a result, it is possible to prevent a frictional force from increasing and the gear-tooth striking sound from being generated at the meshing part.

BRIEF DESCRIPTION OF THE DRAWINGS

FIG. 1A is a partial cutout side view depicting a first example of an embodiment of the present invention, and FIG. 1B is a sectional view taken along a line A-A of FIG. 1A.

FIGS. 3A and 3B are the same views as FIGS. 1A and 1B, illustrating a state of the worm shaft when bimetal is deformed as the temperature decreases.

DETAILED DESCRIPTION OF EMBODIMENTS

First Example of Embodiment

Figures 2A, 2B:
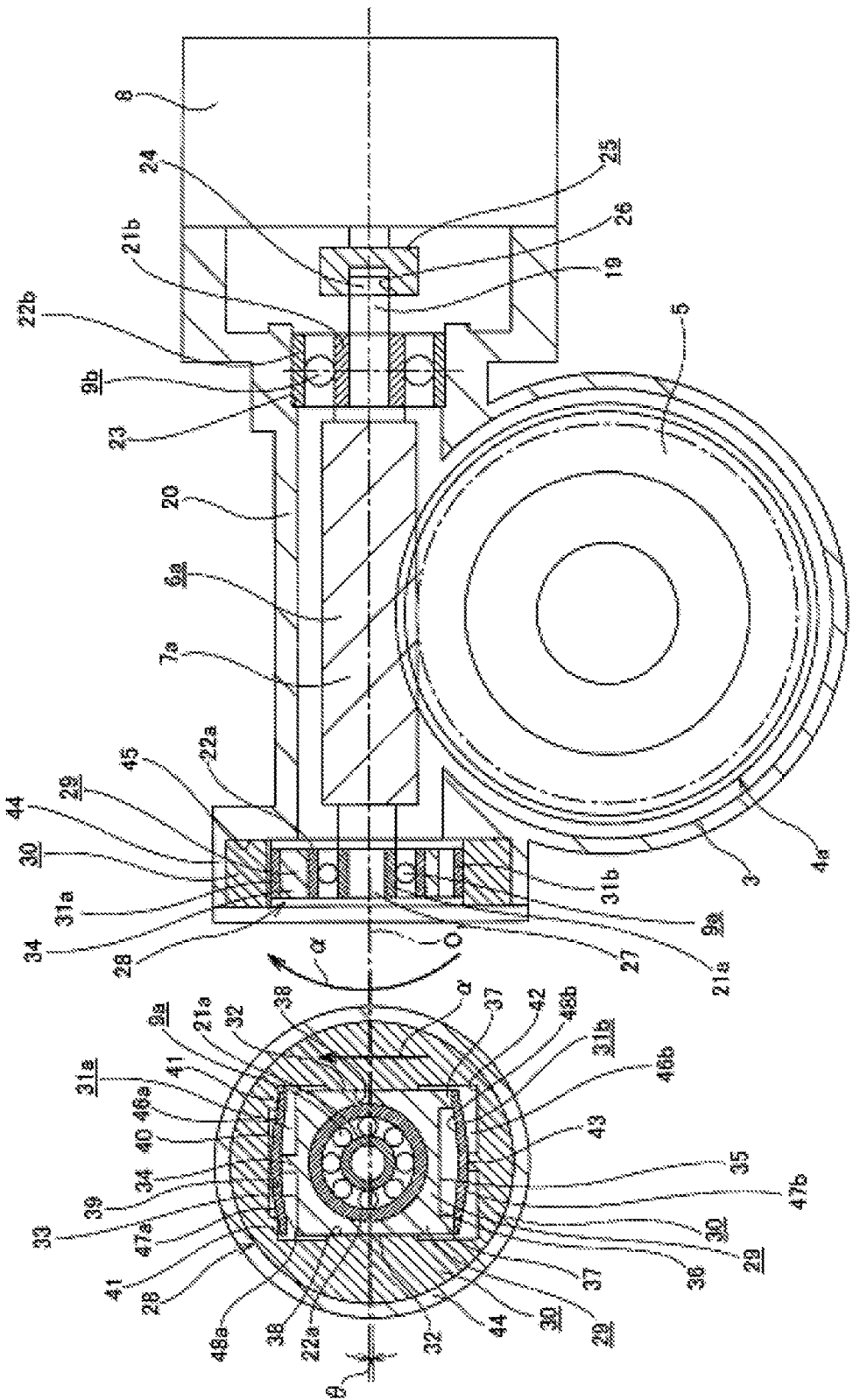
FIGS. 2A and 2B are the same views as FIGS. 1A and 1B, illustrating a state of a worm shaft when bimetal is deformed as a temperature increases.
Figure 15:
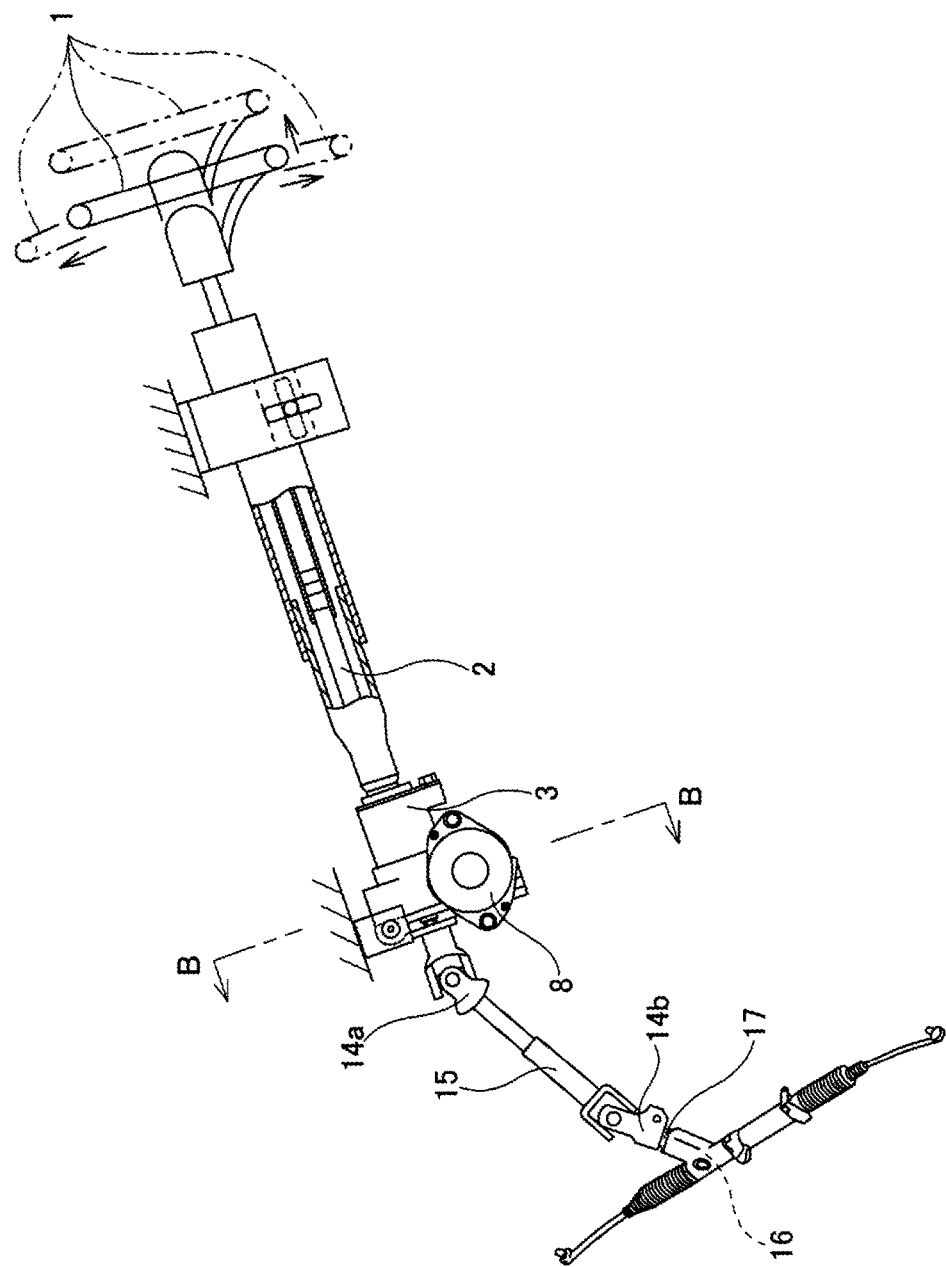
FIG. 15 is a partial cutout side view depicting an example of a structure of the related art.
Figure 16:
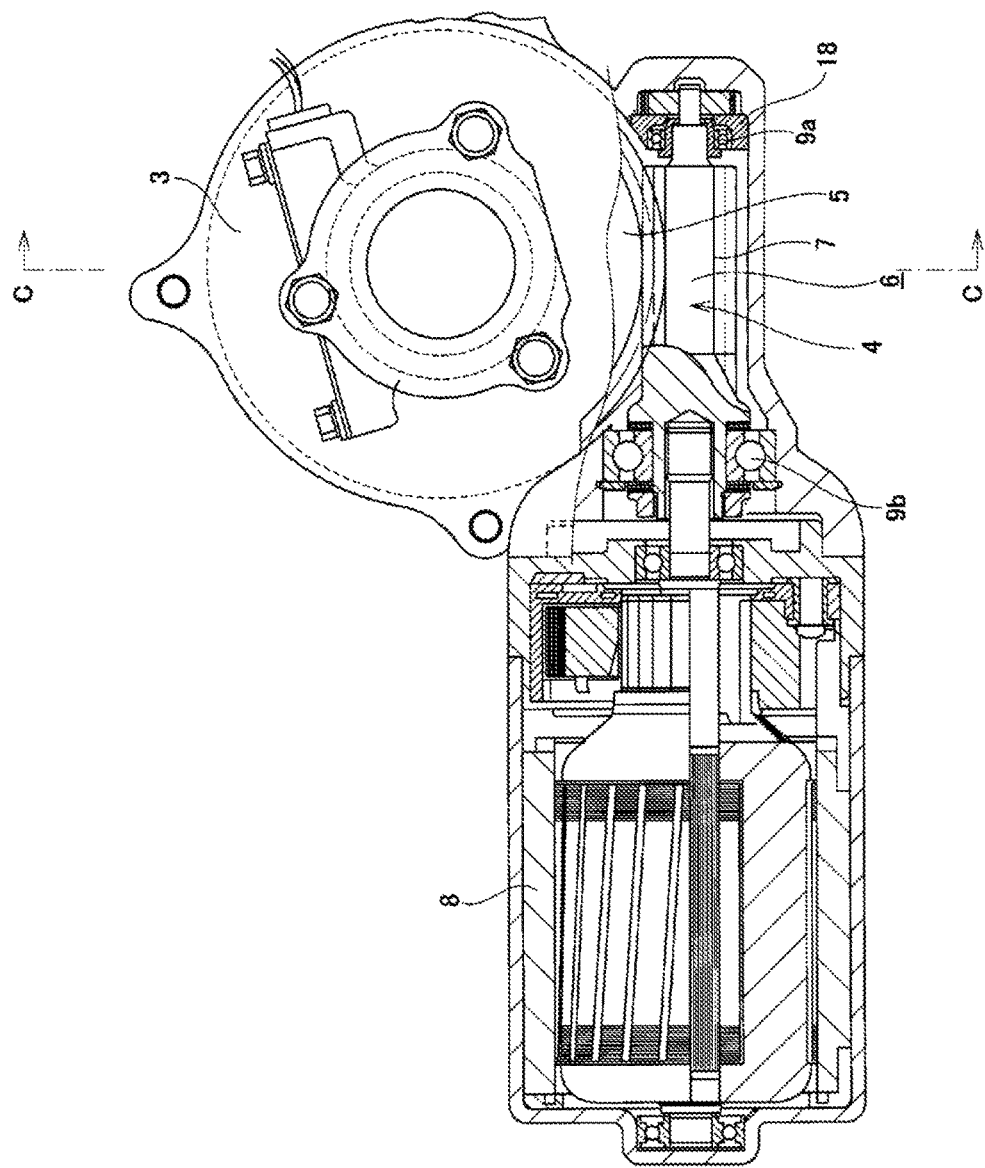
FIG. 16 is an enlarged sectional view taken along a line B-B of FIG. 15.
Figure 17:
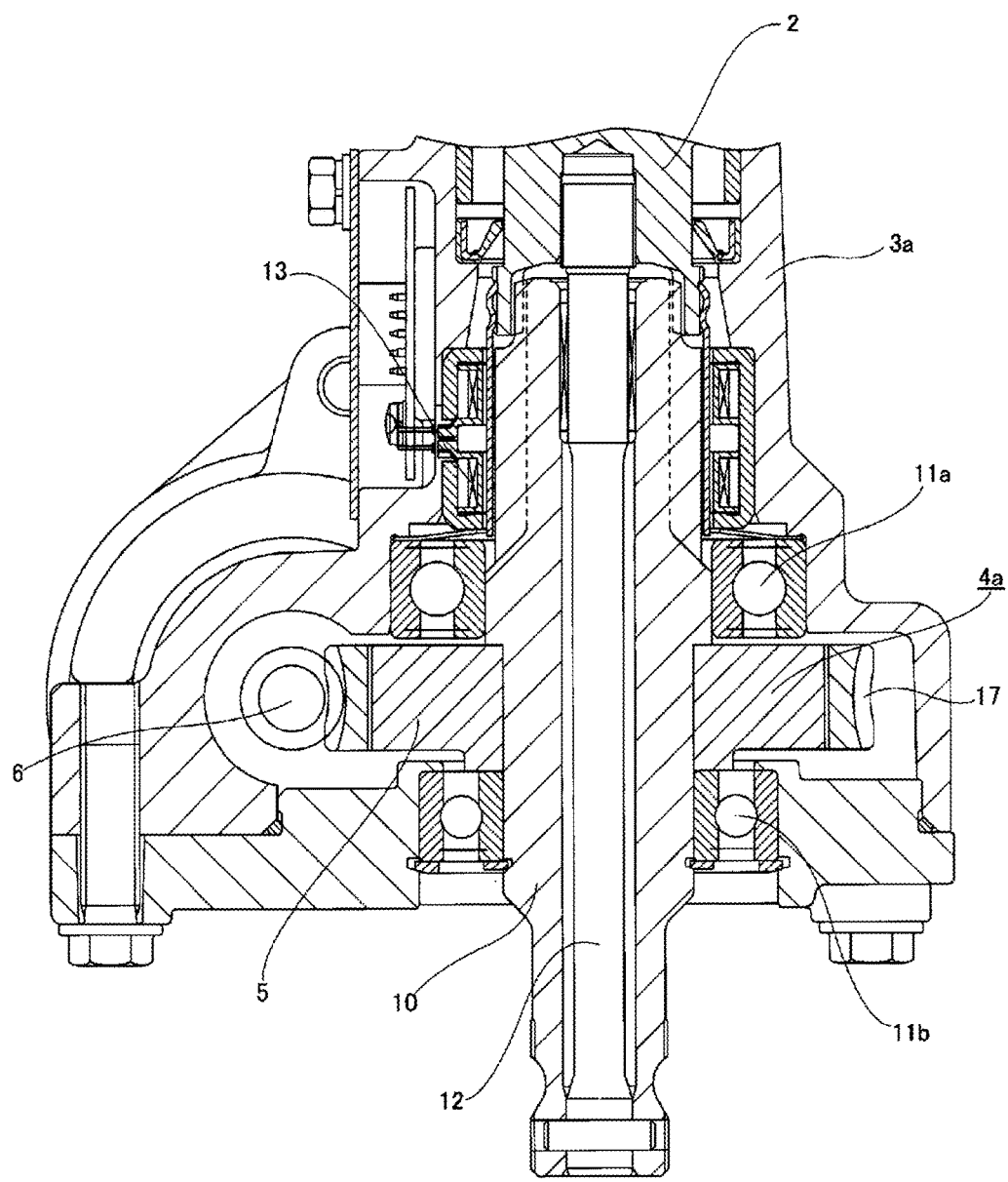
FIG. 17 is a view corresponding to a C-C section of FIG. 16, depicting the specific structure.

A first example of an embodiment of the present invention is described with reference to FIGS. 1 to 3. In the meantime, a feature of an electric power steering device of the first example is a structure where a tip portion of a worm shaft 6a configuring a worm decelerator 4a is supported with respect to a housing 3. The configurations of other parts are basically the same as the structure of the related art shown in FIGS. 15 to 17. For this reason, the descriptions and illustrations of the overlapping parts will be omitted or simplified. Hereinafter, the feature of the first example and parts, which are not described in the above, will be mainly described.

Like the above-described structure of the related art, according to an electric power steering device of the first example, a front end portion of a steering shaft 2 configured to rotate in a predetermined direction by a steering wheel 1 (refer to FIG. 15) is rotatably supported in the housing 3, and a worm wheel 5 configuring a worm decelerator 4a is fixed to the corresponding part. Meanwhile, in the first example, the steering shaft 2 is a member corresponding to the rotary shaft for steering of the claims. Also, worm teeth 7a formed on an axially intermediate part of the worm shaft 6a configuring the worm decelerator 4a are meshed with the worm wheel 5.

In the first example, the worm wheel 5 has a radial inner end portion and an intermediate part made of metal and a radial outer end portion, which includes teeth (not shown) formed on an outer peripheral surface and is made of a synthetic resin. Thereby, it is intended to reduce a gear-tooth striking sound to be generated at the meshing part and a sliding noise upon operation and to save a weight.

The worm shaft 6a has a configuration where an axially intermediate part of a base end-side shaft part 19 provided close to a base end (a right end in FIG. 1) is supported to an inner peripheral surface of a part close to one end (a right end in FIG. 1) of a worm shaft accommodation part 20 configuring the housing 3 via a rolling bearing 9b so that it can rotate and oscillate and be displaced about the rolling bearing 9b. In the meantime, in order to support the worm shaft 6a so that it can oscillate and be displaced about the rolling bearing 9b, a slight gap is formed between an outer peripheral surface of the axially intermediate part of the base end-side shaft part 19 and an inner peripheral surface of an inner ring 21b of the rolling bearing 9b. Alternatively, the worm shaft 6a may be supported to oscillate and be displaced about the rolling bearing 9b by using an internal gap of the rolling bearing 9b, instead of forming the slight gap.

Also, an outer ring 22b of the rolling bearing 9b has other axial end surface (a left end surface in FIG. 1) in contact with a stepped portion 23 formed over an entire circumference of an inner peripheral surface of a part close to one axial end of the worm shaft accommodation part 20. In the meantime, when it is intended to axially position the outer ring 22b, one axial end surface of the outer ring 22b is contacted to other axial end surface of a snap ring engaged with an engaging concave groove (not shown) formed on one axial part, which is beyond the stepped portion 23, of the inner peripheral surface of the worm shaft accommodation part 20.

Also, one axial end portion of the base end-side shaft part 19 has a male spline part 24 formed on an outer peripheral surface thereof and spline-engaged with a female spline part 26 formed on an inner peripheral surface of a joint 25 fixed to a tip portion of an output shaft of the electric motor 8. In this way, a driving force of the electric motor 8 can be transmitted to the worm shaft 6a.

In the meantime, a tip-side shaft part 27 provided at a tip portion (a left end portion in FIG. 1) of the worm shaft 6a is supported to an inner part (a left end portion in FIG. 1) of the worm shaft accommodation part 20 via a rolling bearing 9a and an oscillation mechanism 28 provided at an outer diameter-side of the rolling bearing 9a so that it can rotate relative to the housing 3. Specifically, an outer peripheral surface of the tip-side shaft part 27 is internally fitted and fixed to an inner peripheral surface of an inner ring 21a configuring the rolling bearing 9a by interference fit, and an outer ring 22a configuring the rolling bearing 9a is internally fitted and fixed to an inner peripheral surface of a displacement-side holder 29 configuring the oscillation mechanism 28.

The oscillation mechanism 28 has the displacement-side holder 29, a fixed-side holder 30 and a pair of bimetals 31a, 31b.

The displacement-side holder 29 is made of a synthetic resin having sufficient strength, stiffness, heat resistance and oil resistance such as a high function resin, and has a cylinder shape of which both axial ends are opened. A sectional shape of an outer peripheral surface of the displacement-side holder 29 with respect to a virtual plane orthogonal to a central axis of the worm shaft 6a is substantially rectangular. Likewise, a sectional shape of an inner peripheral surface with respect to the virtual plane is circular.

Also, both surfaces (both surfaces in a left-right direction of FIG. 1B) in a width direction of the displacement-side holder 29 of an outer surface of the displacement-side holder 29 is formed as flat surfaces, and are configured as a pair of oscillated guide surfaces 32, 32.

Also, a central portion in the width direction of a first displacement-side outer surface 33, which is one surface (an upper surface in FIG. 1B) of both surfaces (both surfaces in an upper-lower direction of FIG. 1B) in a height direction of the outer surface of the displacement-side holder 29, is formed with a first displacement-side convex portion 34, which is axially long and more protrudes from the first displacement-side outer surface 33 than the other parts. On the other hand, an intermediate part in the width direction of a second displacement-side outer surface 35, which is the other surface (a lower surface in FIG. 1B) of both surfaces in the height direction of the outer surface of the displacement-side holder 29, is formed with a displacement-side escape concave portion 36, which is axially long. Likewise, both end portions in the width direction are formed with a pair of second displacement-side convex portions 37, 37, which are axially long and more protrude than the displacement-side escape concave portion 36.

The displacement-side holder 29 configured as described above is mounted by externally fitting an inner peripheral surface thereof to an outer peripheral surface of the outer ring 22a configuring the rolling bearing 9a by interference fit.

Like the displacement-side holder 29, the fixed-side holder 30 is made of a synthetic resin having sufficient strength, stiffness, heat resistance and oil resistance such as a high function resin, and has a cylinder shape of which both axial ends are opened. Also, a sectional shape of an outer peripheral surface of the fixed-side holder 30 with respect to the virtual plane orthogonal to the central axis of the worm shaft 6a is circular. Likewise, a sectional shape of an inner peripheral surface with respect to the virtual plane is substantially rectangular. In the meantime, the fixed-side holder 30 may be made of a material different from the displacement-side holder 29.

Also, intermediate parts in the height direction of both surfaces in the width direction of the fixed-side holder 30 of an inner surface of the fixed-side holder 30 are formed as flat surfaces more protruding inward in the width direction than other parts, and the corresponding parts are configured as a pair of oscillation guide surfaces 38, 38.

Also, an intermediate part in a width direction of a first fixed-side inner surface 39, which is one surface of both surfaces in the height direction of the inner surface of the fixed-side holder 30, is formed with a fixed-side escape concave portion 40, which is axially long. Likewise, both end portions in the width direction are formed with a pair of first fixed-side convex portions 41, 41, which are axially long and more protrude than the fixed-side escape concave portion 40.

In contrast, a central portion in a width direction of a second fixed-side inner surface 42, which is the other surface of both surfaces in the height direction of the inner surface of the fixed-side holder 30 is formed with a second fixed-side convex portion 43, which is axially long and more protrudes from the second fixed-side inner surface 42 than other parts.

The fixed-side holder 30 having the above configuration is mounted with an outer peripheral surface thereof being internally fitted and fixed to an inner peripheral surface of a large-diameter cylinder part 44 formed at an inner part (a left end portion in FIG. 1) of the worm shaft accommodation part 20 configuring the housing 3.

At a mounted state as described above, one axial end surface of the fixed-side holder 30 is in contact with a stepped portion 45 configured to continue the large-diameter cylinder part 44 configuring the worm shaft accommodation part 20 and a part located at one axial side beyond the large-diameter cylinder part 44.

Also, both oscillation guide surfaces 38, 38 of the fixed-side holder 30 are in contact with both oscillated guide surfaces 32, 32 of the displacement-side holder 29. Also, the first fixed-side inner surface 39 of the fixed-side holder 30 faces the first displacement-side outer surface 33 of the displacement-side holder 29, and a mounting space 46a for mounting therein one bimetal 31a of a pair of bimetals 31a, 31b (which will be described later) is formed between both the surfaces 39, 33. In the meantime, the second fixed-side inner surface 42 of the fixed-side holder 30 faces the second displacement-side outer surface 35 of the displacement-side holder 29, and a mounting space 46b for mounting therein the other bimetal 31b of the pair of bimetals 31a, 31b (which will be described later) is formed between both the surfaces 42, 35.

Both bimetals 31a, 31b are members corresponding to the composite metal member of the claims, and are formed by laminating two rectangular plate-shaped metal plates having different thermal expansion coefficients (a metal plate having a low thermal expansion coefficient and a metal plate having a high thermal expansion coefficient). When a reference temperature (20° C., in this example) is set, both bimetals 31a, 31b are not deformed at the reference temperature and have a rectangular flat plate shape. In the first example, both bimetals 31a, 31b are disposed so that longitudinal directions of both bimetals 31a, 31b coincide with a width direction (a left-right direction in FIG. 1B) of the displacement-side holder 29. When temperatures (surrounding temperature) of both bimetals 31a, 31b disposed at the corresponding state become higher than the reference temperature, both bimetals 31a, 31b are bent so that centers in the width direction of one side surfaces 47a, 47b in a thickness direction of both bimetals 31a, 31b become convex surfaces and centers in the width direction of the other side surfaces 48a, 48b in the thickness direction become concave surfaces. On the other hand, when the temperatures (surrounding temperature) of both bimetals 31a, 31b become lower than the reference temperature, both bimetals 31a, 31b are bent so that the centers in the width direction of one side surfaces 47a, 47b in the thickness direction of both bimetals 31a, 31b become concave surfaces and the centers in the width direction of the other side surfaces 48a, 48b in the thickness direction become convex surfaces. That is, when the temperatures of both bimetals 31a, 31b are higher or lower than the reference temperature, both bimetals 31a, 31b are bent (deformed) in the opposite directions. In the meantime, as the structure and the material of both bimetals 31a, 31b, a variety of well-known structures and materials can be adopted within a range satisfying the above-described conditions. As the specific materials, Ni—Fe alloy may be used as a material of the metal plate having the low thermal expansion coefficient. In the meantime, Ni, Zn—Cu alloy, Ni—Cr—Fe alloy, Ni—Mn—Fe alloy, Ni—Mo—Fe alloy, Cu—Ni—Mn alloy or the like may be used as a material of the metal plate having the high thermal expansion coefficient, depending on using temperature ranges or the like.

One (an upper side in FIGS. 1 to 3 and a side distant from the worm wheel 5) bimetal 31a of both bimetals 31a, 31b having the above configuration is disposed in the mounting space 46a with one side surface 47a in the thickness direction facing the first fixed-side inner surface 39 of the fixed-side holder 30 and the other side surface 48a in the thickness direction facing the first displacement-side outer surface 33 of the displacement-side holder 29. At this state, both end portions in the width direction of one side surface 47a in the thickness direction of the bimetal 31a are in contact with tip surfaces of both the first fixed-side convex portions 41, 41 of the fixed-side holder 30. In contrast, a central portion in the width direction of the other side surface 48a in the thickness direction of the bimetal 31a is in contact with a tip surface of the first displacement-side convex portion 34 of the displacement-side holder 29.

Also, the other (a lower side in FIGS. 1 to 3 and a side close to the worm wheel 5) bimetal 31b of both bimetals 31a, 31b is disposed in the mounting space 46b with one side surface 47b in the thickness direction facing the second fixed-side inner surface 42 of the fixed-side holder 30 and the other side surface 48b in the thickness direction facing the second displacement-side outer surface 35 of the displacement-side holder 29. At this state, a central portion in the width direction of one side surface 47b in the thickness direction of the bimetal 31b is in contact with a tip surface of the second fixed-side convex portion 43 of the fixed-side holder 30. In contrast, both end portions in the width direction of the other side surface 48b in the thickness direction of the bimetal 31b are in contact with tip surfaces of both the second displacement-side convex portions 37, 37 of the displacement-side holder 29.

In the below, states of the electric power steering device having the above configuration of the first example upon operations are described with reference to FIGS. 1 to 3.

First, FIG. 1 depicts a state where both bimetals 31a, 31b are at the reference temperature (20° C., in the first example). At this state, the backlash of the meshing part between the worm teeth 7a of the worm shaft 6a and the worm wheel 5 is adjusted to a reference backlash amount. In the meantime, as the state shown in FIG. 1, the worm shaft 6a may be pressed toward the worm wheel 5 by a structure such as the elasticity applying means 18 or the like in the conventional structure. When this configuration is adopted, it is possible to set the reference backlash amount to an appropriate amount at which friction (loss of torque to be applied from the electric motor 8) at the meshing part does not increase, a steering property is not heavy upon start of the rotation of the steering wheel 1 and it is possible to prevent an uncomfortable noise referred to as a gear-tooth striking sound from being generated when changing a rotating direction of the steering wheel 1 (steering shaft 2).

Also, at the state shown in FIG. 1, a central axis $O_1$ of the worm shaft 6a is concentric with a central axis of the electric motor 8 (it does not oscillate). Further, at the state shown in FIG. 1, both bimetals 31a, 31b keep the rectangular flat plate shape without being deformed.

From the state shown in FIG. 1, when the temperatures of both bimetals 31a, 31b increase as the surrounding temperature increases, both bimetals 31a, 31b are deformed (bent) so that the centers in the width direction of one side surfaces 47a, 47b in the thickness direction, which are side surfaces facing the fixed-side holder 30, become convex surfaces and the centers in the width direction of the other side surfaces 48a, 48b in the thickness direction become concave surfaces.

Specifically, one bimetal 31a of both bimetals 31a, 31b is deformed so that the center in the width direction of one side surface 47a in the thickness direction becomes a convex surface toward the first fixed-side inner surface 39 of the fixed-side holder 30.

The deformation of one bimetal 31a is to enable the displacement-side holder 29 to be displaced upward in FIG. 2 on the basis of deformation of the other bimetal 31b (which will be described later). Therefore, a high force of interrupting the upward movement of the displacement-side holder 29 is regulated not to be applied from one bimetal 31a to the displacement-side holder 29 as one bimetal 31a is deformed.

Also, the other bimetal 31b of both bimetals 31a, 31b is deformed (bent) so that the central portion in the width direction of one side surface 47b in the thickness direction becomes a convex surface toward the second fixed-side inner surface 42 of the fixed-side holder 30. At this state, the central portion in the width direction of one side surface 47b in the thickness direction of the bimetal 31b presses downward the second fixed-side convex portion 43 of the second fixed-side inner surface 42 in FIG. 2. Then, since the fixed-side holder 30 is supported to the housing 3, both end portions in the width direction of the other side surface 48b in the thickness direction of the bimetal 31b presses upward tip surfaces of both the second displacement-side convex portions 37, 37 of the displacement-side holder 29 by a reactive force based on the pressing, in FIG. 2. With the pressing, the displacement-side holder 29 is displaced upward in FIG. 2 by the deformation amount in the upper-lower direction of the bimetal 31b in FIG. 2 with both oscillated guide surfaces 32, 32 of the displacement-side holder 29 being guided by both oscillation guide surfaces 38, 38 of the fixed-side holder 30. In the meantime, the pressing force at this time (the pressing force away from the worm wheel 5) corresponds to one pressing force of the claims.

Meanwhile, in the first example, since both bimetals 31a, 31b are made to have the same structure, the deformation amounts in the upper-lower direction of both bimetals 31a, 31b in FIG. 2 are the same. For this reason, at the state shown in FIG. 2, the tip surface of the first displacement-side convex portion 34 of the displacement-side holder 29 is in contact with the central portion in the width direction of the other side surface 48a in the thickness direction of one bimetal 31a. Also, the central portion in the width direction of one side surface 47a in the thickness direction of the bimetal 31a is located in the fixed-side escape concave portion 40 of the fixed-side holder 30. Therefore, when the other bimetal 31b applies the upward pressing force (away from the worm wheel 5) to the displacement-side holder 29, one bimetal 31a does not apply a downward pressing force, which cancels the pressing force, to the displacement-side holder 29.

With the displacement of the displacement-side holder 29 as described above, the worm shaft 6a oscillates about the rolling bearing 9b away from the worm wheel 5 (refer to a a direction in FIG. 2), so that a distance between the central axis of the worm shaft 6a and the central axis of the worm wheel 5 increases.

Meanwhile, at the state of FIG. 2, when the reactive force is applied from the worm wheel 5 to the meshed worm shaft 6a, the worm shaft 6a can be pressed to the worm wheel 5 by an elastic force of one deformed bimetal 31a.

In contrast, from the state of FIG. 1, when the temperatures of both bimetals 31a, 31b decrease as the surrounding temperature decreases, both bimetals 31a, 31b are respectively bent so that the centers in the width direction of one side surfaces 47a, 47b in the thickness direction become concave surfaces and the centers in the width direction of the other side surfaces 48a, 48b in the thickness direction become convex surfaces.

Specifically, the other bimetal 31b of both bimetals 31a, 31b is bent so that the center in the width direction of the other side surface 48b in the thickness direction becomes a convex surface toward the second displacement-side outer surface 35 of the displacement-side holder 29. In the meantime, the deformation of the other bimetal 31b is to enable the displacement-side holder 29 to be displaced downward in FIG. 2 on the basis of deformation of one bimetal 31a (which will be described later). Therefore, a high force of interrupting the downward movement of the displacement-side holder 29 is regulated not to be applied from the bimetal 31b to the displacement-side holder 29 as the other bimetal 31b is deformed.

Also, one bimetal 31a of both bimetals 31a, 31b is deformed (bent) so that the central portion in the width direction of the other side surface 48a in the thickness direction becomes a convex surface toward the first displacement-side outer surface 33 of the displacement-side holder 29. At this state, both end portions in the width direction of one side surface 47a in the thickness direction of the bimetal 31a presses upward both the first fixed-side convex portions 41, 41 of the fixed-side holder 30 in FIG. 3. Then, since the fixed-side holder 30 is supported to the housing 3, the central portion in the width direction of the other side surface 48a in the thickness direction of the bimetal 31a presses downward the tip surface of the first displacement-side convex portion 34 of the displacement-side holder 29 by a reactive force based on the pressing, in FIG. 2. With the pressing, the displacement-side holder 29 is displaced downward in FIG. 2 by the deformation amount in the upper-lower direction of the displacement-side holder 29 in FIG. 3 with both oscillated guide surfaces 32, 32 being guided by both oscillation guide surfaces 38, 38 of the fixed-side holder 30. In the meantime, the pressing force at this time (the pressing force toward the worm wheel 5) corresponds to the other pressing force of the claims.

Also, at the state of FIG. 3, the tip surfaces of both the second displacement-side convex portions 37, 37 of the displacement-side holder 29 are in contact with both end portions in the width direction of the other side surface 48b in the thickness direction of the other bimetal 31b. Also, the center in the width direction of the other side surface 48b in the thickness direction of the bimetal 31b is located in the displacement-side escape concave portion 36 of the displacement-side holder 29. Therefore, when one bimetal 31a applies the downward pressing force (toward the worm wheel 5) to the displacement-side holder 29, the other bimetal 31b does not apply a upward pressing force, which cancels the pressing force, to the displacement-side holder 29.

As the displacement-side holder 29 is displaced as described above, the worm shaft 6a oscillates about the rolling bearing 9b toward the worm wheel 5 (refer to a (3 direction in FIG. 2) by an angle θ, so that the distance between the central axis of the worm shaft 6a and the central axis of the worm wheel 5 decreases.

According to the electric power steering device having the above configuration of the first example, it is possible to keep the backlash at the meshing part between the worm teeth 7b configuring the worm shaft 6b and the worm wheel 5 to an appropriate magnitude (the reference backlash amount), irrespective of expansion and contraction of the worm wheel 5.

That is, the first example provides the oscillation mechanism 28 (both bimetals 31a, 31b) that can cause the worm shaft 6b to oscillate and be displaced away from the worm wheel 5 (refer to FIG. 2) when the temperature thereof becomes higher than the reference temperature and the worm shaft 6b to oscillate and be displaced toward the worm wheel 5 when the temperature thereof becomes lower than the reference temperature. For this reason, even when the worm wheel 5 is thermally expanded or contracted in association with the change in temperature and the backlash amount at the meshing part is thus changed, the deformation of the oscillation mechanism 28 (both bimetals 31a, 31b) can cause the worm shaft 6b to oscillate and be displaced, thereby keeping the backlash amount of the meshing part to the appropriate amount (the reference backlash amount).

Specifically, when the temperature of the worm wheel 5 increases as the surrounding temperature increases, the worm wheel 5 is thermally expanded, so that the backlash amount of the meshing part between the worm teeth 7a and the worm wheel 5 decreases from the reference backlash amount. As a result, the friction (loss of torque to be applied from the electric motor 8) at the meshing part increases, so that a steering feeling may be heavy upon start of rotation of the steering wheel 5. Therefore, according to the electric power steering device of the first example, as the surrounding temperature increases, both bimetals 31a, 31b configuring the oscillation mechanism 28 cause the worm shaft 6a to oscillate and be displaced away from the worm wheel 5 (a direction in which the backlash amount of the meshing part can be increased), thereby making the backlash amount of the meshing part close to the reference backlash amount (matching), as shown in FIG. 2.

On the other hand, when the temperature of the worm wheel 5 decreases as the surrounding temperature decreases, the worm wheel 5 is thermally contracted, so that the backlash amount of the meshing part between the worm teeth 7a and the worm wheel 5 increases from the reference backlash amount. As a result, when changing the rotating direction of the steering wheel 1 (steering shaft 2), an uncomfortable noise referred to as a gear-tooth striking sound is likely to occur. Therefore, according to the electric power steering device of the first example, as the surrounding temperature decreases, both bimetals 31a, 31b configuring the oscillation mechanism 28 cause the worm shaft 6a to oscillate and be displaced toward the worm wheel 5 (a direction in which the backlash of the meshing part is to be reduced), thereby making the backlash amount of the meshing part close to the reference backlash amount (matching), as shown in FIG. 3.

Second Example of Embodiment

Figure 4:
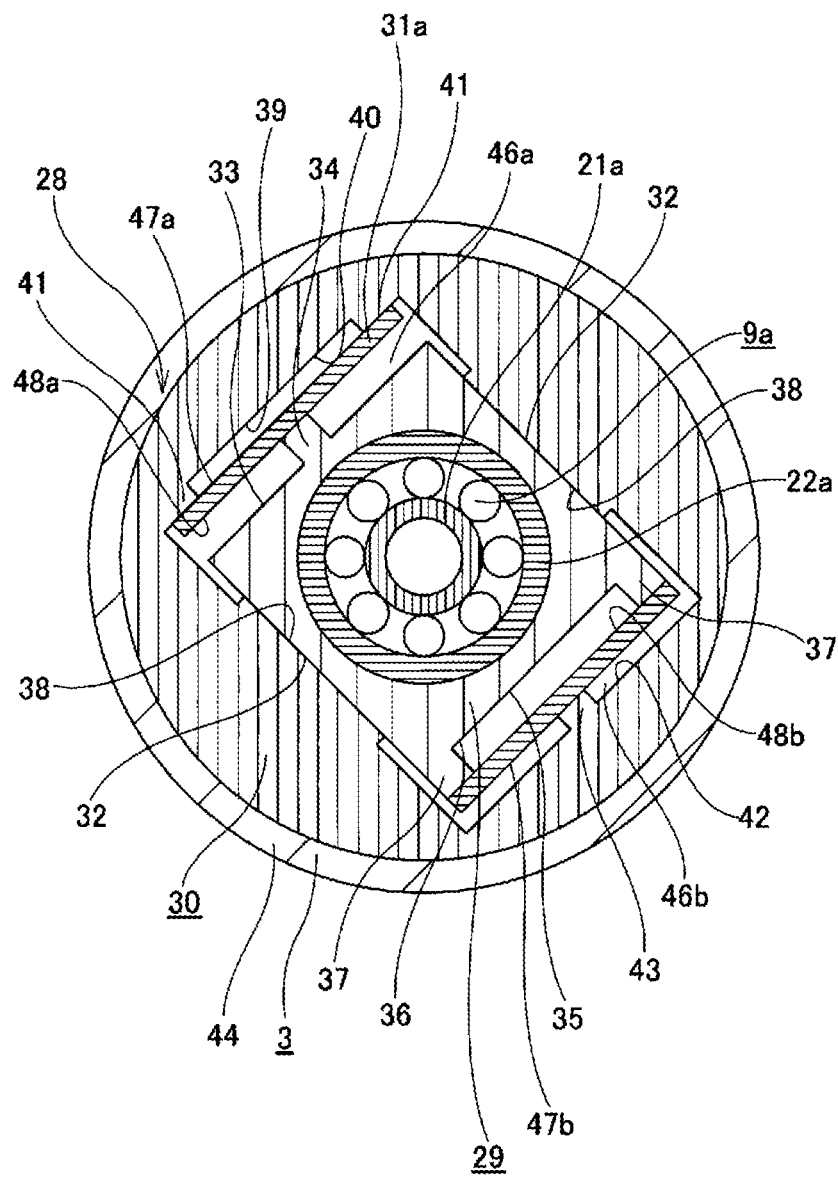
FIG. 4 is the same view as FIG. 1B, depicting a second example of the embodiment of the present invention.

A second example of the embodiment of the present invention is described with reference to FIG. 4. According to the electric power steering device of the second example, the oscillation mechanism 28 having the same configuration as the first example of the embodiment is mounted between the tip-side shaft part 27 (refer to FIG. 1) of the worm shaft 6a and the large-diameter cylinder part 44 formed at the inner part of the housing 3 via the rolling bearing 9a with being rotated in one circumferential direction (a counterclockwise direction in FIGS. 1B, 2B, 3B and 4) by 45°, as compared to the first example of the embodiment. Therefore, the direction in which the displacement-side holder 29 is displaced and the direction in which the worm shaft 6a oscillates as the surrounding temperature increases or decreases are also rotated by 45°, as compared to the first example of the embodiment.

As described above, the angle by which the oscillation mechanism 28 is to be rotated is arbitrarily set, so that it is possible to arbitrarily set the displacement direction of the displacement-side holder 29 and the oscillation direction of the worm shaft 6a. The other configurations and operational effects are the same as the first example of the embodiment.

Third Example of Embodiment

A third example of the embodiment of the present invention is described with reference to FIG. 5. A displacement-side holder 29a and a fixed-side holder 30a configuring an oscillation mechanism 28a of the electric power steering device of the third example have a structure where the displacement-side holder 29 and the fixed-side holder 30 configuring the oscillation mechanism 28 of the electric power steering device of the first example of the embodiment are rotated by 180° with respect to the central axis of the worm shaft 6b. Also, both bimetals 31c, 31d are disposed in such a way that the bimetals 31a, 31b of the first example of the embodiment are reversed (the surface and backside are reversed) with respect to the upper-lower direction of FIGS. 1 to 3. Therefore, when the surrounding temperature changes, both bimetals 31c, 31d of the third example are deformed inversely with the first example of the embodiment. Hereinafter, the parts corresponding to the displacement-side holder 29 and the fixed-side holder 30 configuring the oscillation mechanism 28 of the first example of the embodiment are denoted with the same reference numerals and the states of the third example upon the operation are described.

Figure 5:
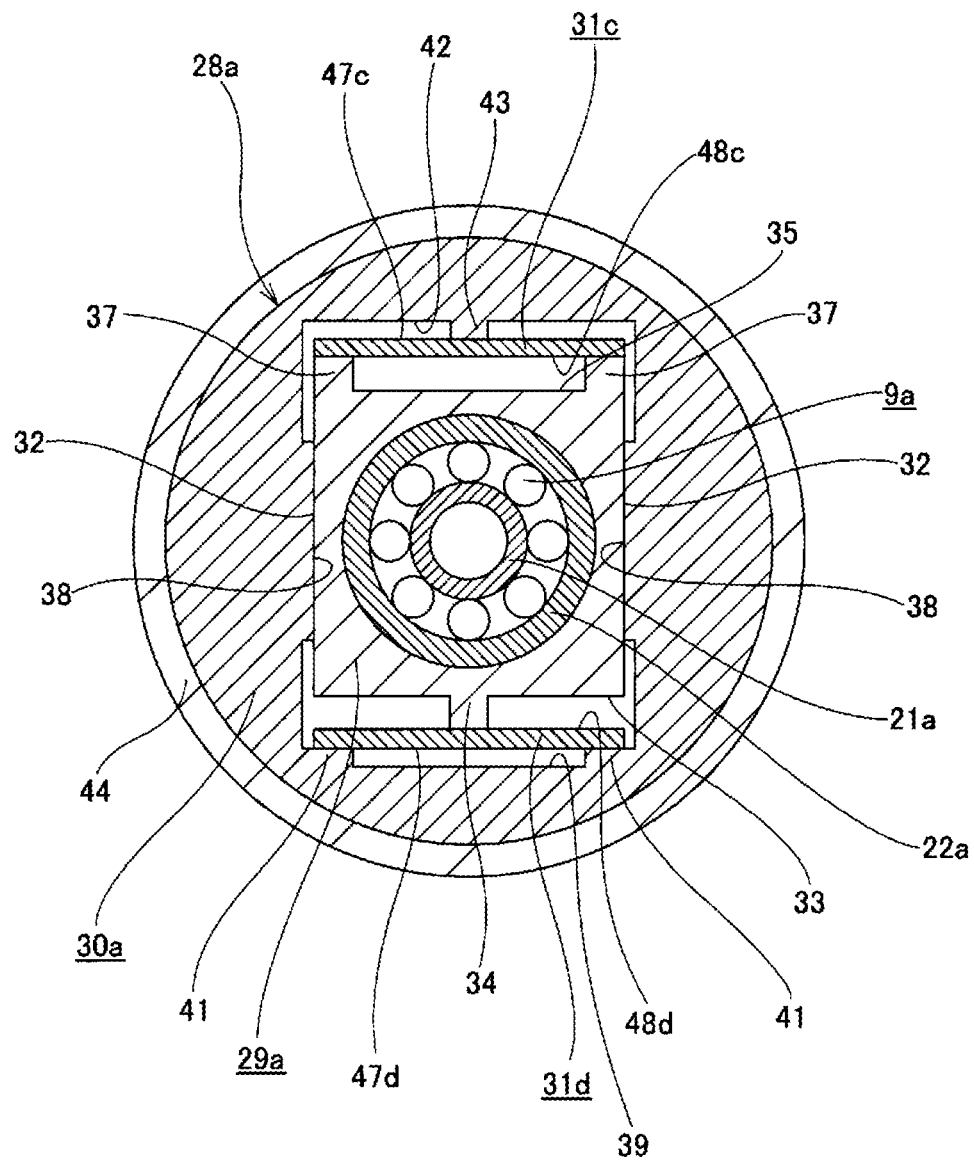
FIG. 5 is the same view as FIG. 1B, depicting a third example of the embodiment of the present invention.

In the third example, from the state of FIG. 5, when the temperatures of both bimetals 31c, 31d increase as the surrounding temperature increases, both bimetals 31c, 31d are bent so that centers in the width direction of one side surfaces 47c, 47d in the thickness direction, which are side surfaces facing the fixed-side holder 30a, become concave surfaces and centers in the width direction of the other side surfaces 48c, 48d in the thickness direction, which are side surfaces facing the displacement-side holder 29a, become convex surfaces.

Specifically, one (an upper side in FIG. 5 and a side distant from the worm wheel 5) bimetal 31c of both bimetals 31c, 31d is deformed so that the center in the width direction of the other side surface 48c in the thickness direction becomes a convex surface toward the second displacement-side outer surface 35 of the displacement-side holder 29. In the meantime, the deformation of one bimetal 31c is to enable the displacement-side holder 29 to be displaced upward in FIG. 5 on the basis of deformation of the other bimetal 31d (which will be described later). Therefore, a high force of interrupting the upward movement of the displacement-side holder 29 is regulated not to be applied from the bimetal 31c to the displacement-side holder 29 as one bimetal 31c is deformed.

Also, the other (a lower side in FIG. 5 and a side close to the worm wheel 5) bimetal 31d of both bimetals 31c, 31d is deformed (bent) so that a central portion in the width direction of the other side surface 48d in the thickness direction becomes a convex surface toward the first displacement-side outer surface 33 of the displacement-side holder 29. At this state, both end portions in the width direction of one side surface 47d in the thickness direction of the bimetal 31d press downward both the first fixed-side convex portions 41, 41 of the fixed-side holder 30 in FIG. 5. Then, since the fixed-side holder 30 is supported to the housing 3, the central portion in the width direction of the other side surface 48d in the thickness direction of the bimetal 31d presses upward the tip surface of the first displacement-side convex portion 34 of the displacement-side holder 29 by a reactive force based on the pressing, in FIG. 5. With the pressing, the displacement-side holder 29 is displaced upward in FIG. 5 by the deformation amount in the upper-lower direction of the bimetal 31d in FIG. 5 with both oscillated guide surfaces 32, 32 of the displacement-side holder 29 being guided by both oscillation guide surfaces 38, 38 of the fixed-side holder 30.

In contrast, from the state of FIG. 5, when the temperatures of both bimetals 31c, 31d decrease as the surrounding temperature decreases, both bimetals 31c, 31c are respectively deformed (bent) so that the centers in the width direction of one side surfaces 47a, 47b in the thickness direction, which are side surfaces facing the fixed-side holder 30, become convex surfaces and the centers in the width direction of the other side surfaces 48a, 48b in the thickness direction become concave surfaces.

Specifically, the other bimetal 31d of both bimetals 31c, 31d is bent so that the center in the width direction of one side surface 47a in the thickness direction becomes a convex surface toward the first fixed-side inner surface 39 of the fixed-side holder 30.

In the meantime, the deformation of the other bimetal 31d is to enable the displacement-side holder 29 to be displaced downward in FIG. 5 on the basis of deformation of one bimetal 31c (which will be described later). Therefore, a high force of interrupting the downward movement of the displacement-side holder 29 is regulated not to be applied from the bimetal 31d to the displacement-side holder 29 as the other bimetal 31d is deformed.

Also, one bimetal 31c of both bimetals 31c, 31c is deformed (bent) so that the central portion in the width direction of one side surface 47b in the thickness direction becomes a convex surface toward the second fixed-side inner surface 42 of the fixed-side holder 30. At this state, the central portion in the width direction of one side surface 47b in the thickness direction of the bimetal 31c presses upward the second fixed-side convex portion 43 of the second fixed-side inner surface 42 in FIG. 5. Then, since the fixed-side holder 30 is supported to the housing 3, both end portions in the width direction of the other side surface 48b in the thickness direction of the bimetal 31c press downward the tip surfaces of both the second displacement-side convex portions 37, 37 of the displacement-side holder 29 by a reactive force based on the pressing, in FIG. 5. With the pressing, the displacement-side holder 29 is displaced downward in FIG. 5 by the deformation amount in the upper-lower direction of the bimetal 31c in FIG. 5 with both oscillated guide surfaces 32, 32 of the displacement-side holder 29 being guided by both oscillation guide surfaces 38, 38 of the fixed-side holder 30. The other configurations and operational effects are the same as the first example of the embodiment.

Fourth Example of Embodiment

A fourth example of the embodiment of the present invention is described with reference to FIGS. 6 and 7. Also in the electric power steering device of the fourth example, an oscillation mechanism 28b is configured by a displacement-side holder 29b, a fixed-side holder 30b and a pair of bimetals 31e, 31f.

The displacement-side holder 29b has a first displacement-side convex portion 34a, which is long in the width direction (a surface and backside direction of FIG. 6A, a left-right direction in FIG. 6B) and is formed at an axially central portion of a first displacement-side outer surface 33a, which is one surface (an upper surface in FIGS. 6A and 6B) of both surfaces (both surfaces in the upper-lower direction of FIGS. 6A and 6B) in a height direction of an outer surface of the displacement-side holder. In the meantime, an axially intermediate part of a second displacement-side outer surface 35a, which is the other surface (a lower surface in FIGS. 6A and 6B) of both surfaces in the height direction of the outer surface of the displacement-side holder 29b, is formed with a displacement-side escape concave portion 36a that is long in the width direction. Likewise, both axial end portions are formed with a pair of second displacement-side convex portions 37a, 37a long in the width direction with more protruding than the displacement-side escape concave portion 36a. The displacement-side holder 29b having the above configuration is mounted with an inner peripheral surface thereof being externally fitted and fixed to the outer peripheral surface of the outer ring 22a configuring the rolling bearing 9a by interference fit, like the respective examples of the embodiment. The other structures of the displacement-side holder 29b are the same as the displacement-side holder 29 of the first example of the embodiment.

The fixed-side holder 30b has a fixed-side escape concave portion 40a, which is long in the width direction and is formed at an axially intermediate part of the first fixed-side inner surface 39a, which is one surface of both surfaces in a height direction of an inner surface of the fixed-side holder. Also, both axial end portions of the first fixed-side inner surface 39a are formed with a pair of first fixed-side convex portions 41a, 41a long in the width direction with more protruding than the fixed-side escape concave portion 40a. In the meantime, an axially central portion of a second fixed-side inner surface 42a, which is the other surface of both surfaces in the height direction of the inner surface of the fixed-side holder 30b, is formed with a second fixed-side convex portion 43a long in the width direction with more protruding than the second fixed-side inner surface 42a. The fixed-side holder 30b having the above configuration is mounted with an outer peripheral surface thereof being internally fitted and fixed to an inner peripheral surface of the large-diameter cylinder part 44 formed at the inner part (a left end portion in FIG. 6) of the worm shaft accommodation part 20 configuring the housing 3, like the respective examples of the embodiment.

Like the respective examples of the embodiment, when the reference temperature (20° C., in the fourth example) is set, both bimetals 31e, 31f have a rectangular flat plate shape that is not to be deformed at the reference temperature. Both bimetals 31e, 31f are bent so that centers in an axial direction (longitudinal directions of both bimetals 31e, 31f) of one side surfaces 47e, 47f in the thickness direction of both bimetals 31e, 31f become convex surfaces and centers in the axial direction of the other side surfaces 48e, 48f in the thickness direction become concave surfaces when the temperatures (surrounding temperature) of both bimetals 31e, 31f becomes higher than the reference temperature. On the other hand, both bimetals are bent so that the centers in the axial direction (longitudinal directions of both bimetals 31e, 31f) of one side surfaces 47e, 47f in the thickness direction of both bimetals 31e, 31f become concave surfaces and the centers in the axial direction of the other side surfaces 48e, 48f in the thickness direction become convex surfaces when the temperatures (surrounding temperature) of both bimetals 31e, 31f becomes lower than the reference temperature. That is, both bimetals 31e, 31f are bent (deformed) in the opposite directions when the temperatures of both bimetals 31e, 31f are higher and lower than the reference temperature.

Both bimetals 31e, 31f having the above configuration are disposed so that the longitudinal directions of both bimetals 31e, 31f coincide with the axial direction of the displacement-side holder 29b. Also, one (an upper side in FIGS. 6 and 7 and a side distant from the worm wheel 5) bimetal 31e of both bimetals 31e, 31f is disposed in the mounting space 46a with one side surface 47e in the thickness direction facing the first fixed-side inner surface 39a of the fixed-side holder 30b and the other side surface 48f in the thickness direction facing the first displacement-side outer surface 33a of the displacement-side holder 29b. At this state, both axial end portions of one side surface 47e in the thickness direction of the bimetal 31e are in contact with tip surfaces of both the first fixed-side convex portions 41a, 41a of the fixed-side holder 30b. In contrast, an axially central portion of the other side surface 48e in the thickness direction of the bimetal 31e is in contact with a tip surface of the first displacement-side convex portion 34a of the displacement-side holder 29b.

Also, the other (a lower side in FIGS. 6 and 7 and a side close to the worm wheel 5) bimetal 31f of both bimetals 31e, 31f is disposed in the mounting space 46b with one side surface 47f in the thickness direction facing the second fixed-side inner surface 42a of the fixed-side holder 30b and the other side surface 48f in the thickness direction facing the second displacement-side outer surface 35a of the displacement-side holder 29b. At this state, an axially central portion of one side surface 47f in the thickness direction of the bimetal 31f is in contact with a tip surface of the second fixed-side convex portion 43a of the fixed-side holder 30b. In contrast, both end portions in the axial direction of the other side surface 48b in the thickness direction of the bimetal 31b are in contact with tip surfaces of both the second displacement-side convex portions 37a, 37a of the displacement-side holder 29b.

The states of the electric power steering device having the above configuration of the fourth example upon the operation are described. From the state (state of the reference temperature) shown in FIG. 6, when the temperatures of both bimetals 31e, 31f increase as the surrounding temperature increases, both bimetals 31e, 31f are deformed (bent) so that the centers in the axial direction of one side surfaces 47e, 47f in the thickness direction, which are side surfaces facing the fixed-side holder 30b, become convex surfaces and the centers in the axial direction of the other side surface 48e, 48f in the thickness direction become concave surfaces, as shown in FIG. 7.

Figure 7:
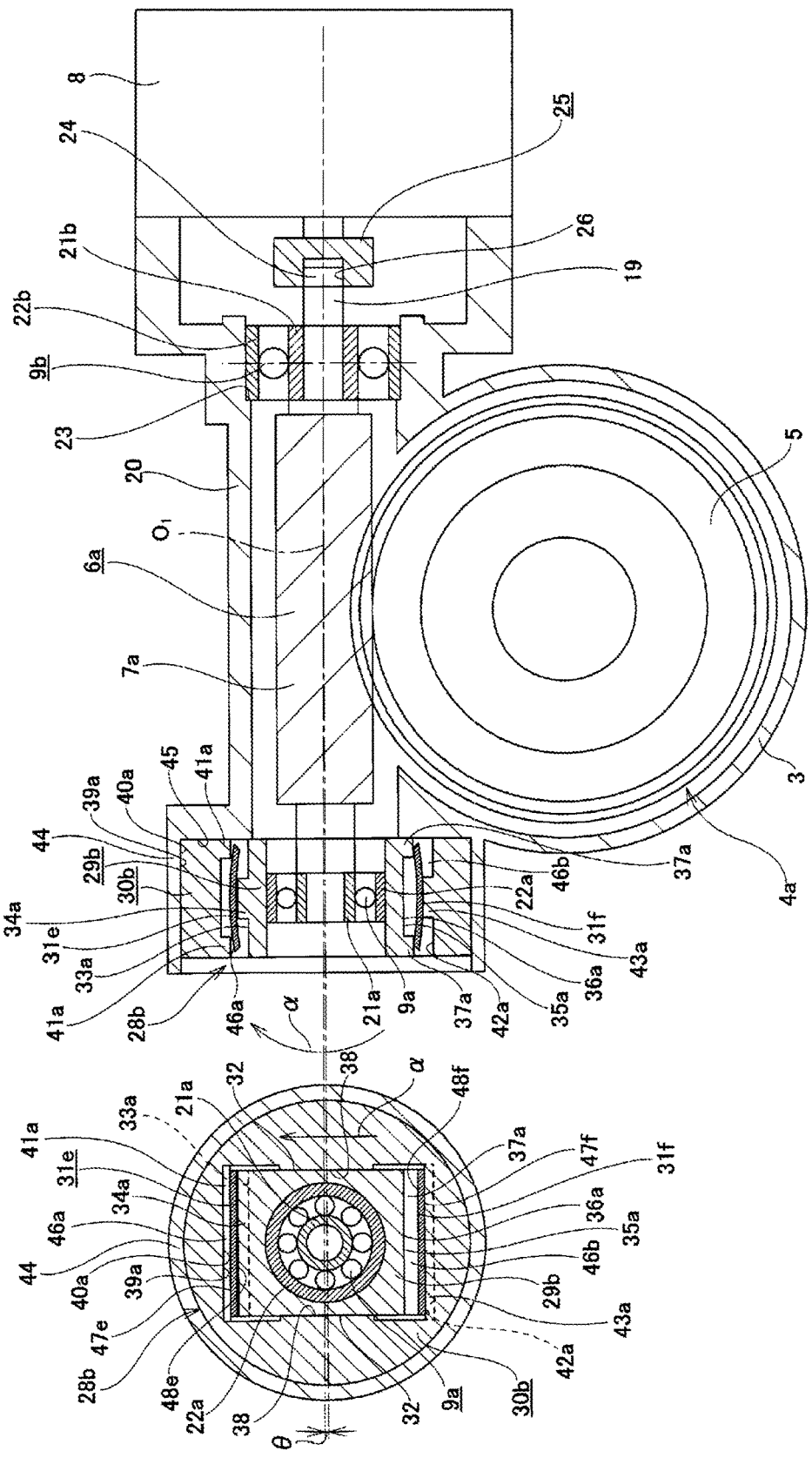
FIGS. 7A and 7B are the same views as FIGS. 6A and 6B, illustrating a state of the worm shaft when bimetal is deformed as the temperature increases.

At this state, a center in the axial direction of one side surface 47f in the thickness direction of the bimetal 31f presses downward the second fixed-side convex portion 43a of the second fixed-side inner surface 42a in FIG. 7. Then, since the fixed-side holder 30b is supported to the housing 3, both end portions in the axial direction of the other side surface 48f in the thickness direction of the bimetal 31f press upward the tip surfaces of both the second displacement-side convex portions 37a, 37a of the displacement-side holder 29b by a reactive force based on the pressing, in FIG. 7. With the pressing, the displacement-side holder 29b is displaced upward in FIG. 7 by the deformation amount in the upper-lower direction of the bimetal 31b in FIG. 7 with both oscillated guide surfaces 32, 32 of the displacement-side holder 29b being guided by both oscillation guide surfaces 38, 38 of the fixed-side holder 30b.

Meanwhile, in the fourth example, since both bimetals 31e, 31f are made to have the same structure, the deformation amounts in the upper-lower direction of both bimetals 31e, 31f in FIG. 7 are the same. For this reason, at the state shown in FIG. 7, the tip surface of the first displacement-side convex portion 34a of the displacement-side holder 29b is in contact with the axially central portion of the other side surface 48e in the thickness direction of one bimetal 31e. Also, the axially central portion of one side surface 47e in the thickness direction of the bimetal 31e is located in the fixed-side escape concave portion 40a of the fixed-side holder 30b.

Figure 6:
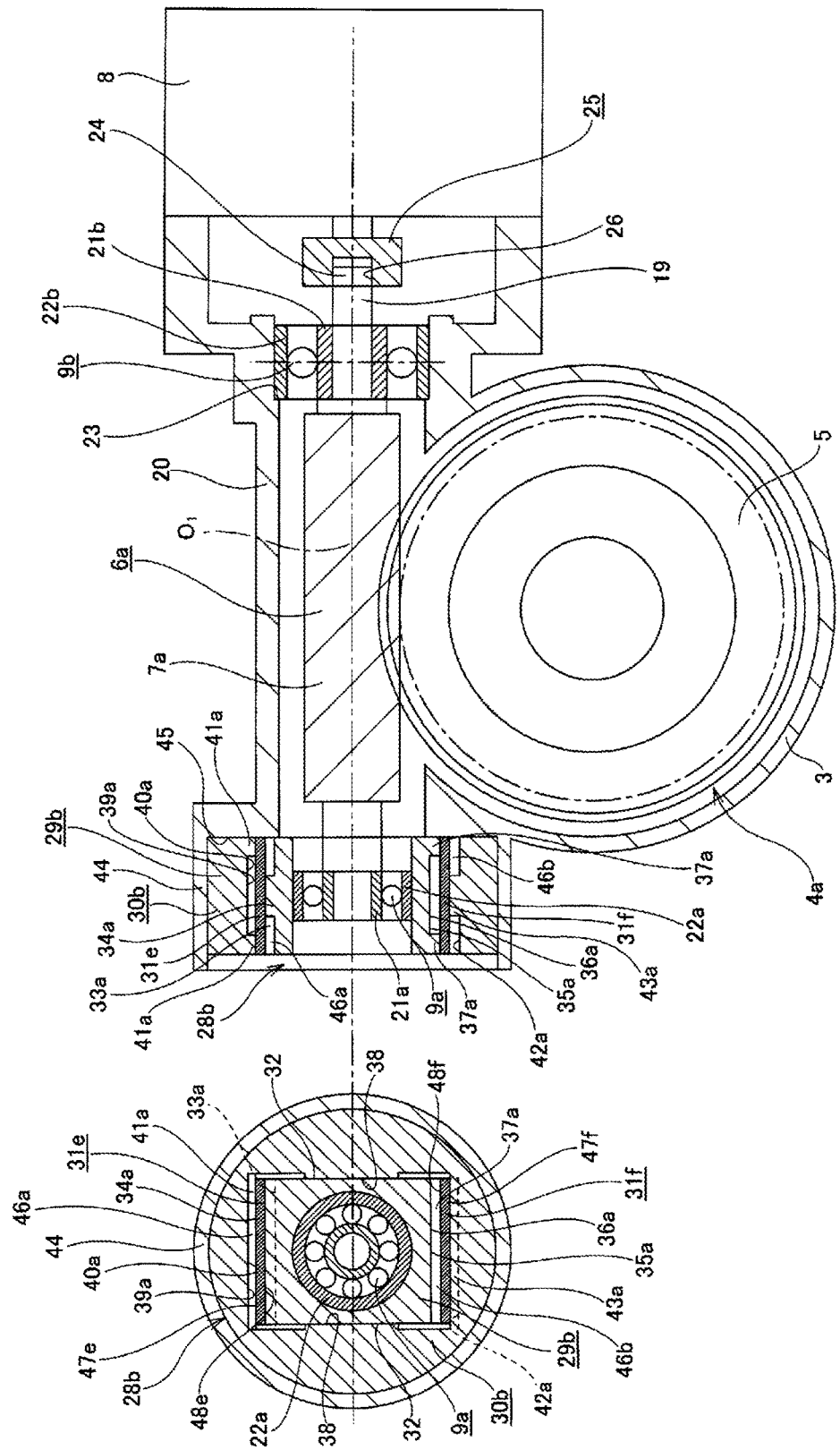
FIGS. 6A and 6B are the same views as FIGS. 1A and 1B, depicting a fourth example of the embodiment of the present invention.

Also, from the state of FIG. 6, the operating states, which are to be performed when the temperatures of both bimetals 31e, 31f decrease as the surrounding temperature decreases, are opposite to the operating states, which are to be performed when the surrounding temperature increases. Since the specific operations have been described in the first example of the embodiment, the detailed descriptions thereof are omitted. The other configurations and operational effects are the same as the first example of the embodiment.

Fifth Example of Embodiment

A fifth example of the embodiment of the present invention is described with reference to FIGS. 8 to 10. Also in the electric power steering device of the fifth example, an oscillation mechanism 28c is configured by a displacement-side holder 29c, a fixed-side holder 30c and a pair of bimetals 31g, 31h.

The displacement-side holder 29c has a first displacement-side convex portion 34b, which is long in the axial direction and is formed with more protruding from the first displacement-side outer surface 33b than the other parts at a central portion in the width direction of a first displacement-side outer surface 33b, which is one surface (an upper surface in FIGS. 8 to 10) of both surfaces (both surfaces in the upper-lower direction in FIGS. 8 to 10) in a height direction of an outer surface of the displacement-side holder. In the meantime, the first displacement-side convex portion 34b has substantially the same shape as the displacement-side convex portion 34 of the first example of the embodiment.

Also, a central portion in the width direction of a second displacement-side outer surface 35b, which is the other surface (a lower surface in FIGS. 8 to 10) of both surfaces in the height direction of the outer surface of the displacement-side holder 29c, is formed with a second displacement-side convex portion 37b that is long in the axial direction and more protrudes from the second displacement-side outer surface 35b than the other parts. The other structures of the displacement-side holder 29c are the same as the displacement-side holder 29 of the first example of the embodiment.

The displacement-side holder 29c having the above configuration is mounted with an inner peripheral surface thereof being externally fitted and fixed to the outer peripheral surface of the outer ring 22a configuring the rolling bearing 9a by interference fit.

The fixed-side holder 30c has a fixed-side escape concave portion 40b, which is long in the axial direction and is formed at an intermediate part in the width direction of a first fixed-side inner surface 39b, which is one surface of both surfaces in a height direction of an inner surface of the fixed-side holder. Also, both end portions in the width direction of the first fixed-side inner surface 39b are formed with a pair of first fixed-side convex portions 41b, 41b, which are long in the axial direction and more protrude than the fixed-side escape concave portion 40b. In the meantime, the fixed-side escape concave portion 40b and both the first fixed-side convex portions 41b, 41b have substantially the same shapes as the fixed-side escape concave portion 40 and both the first fixed-side convex portions 41, 41 of the first example of the embodiment.

Also, the fixed-side holder 30c has a second fixed-side escape concave portion 49, which is long in the axial direction and is formed at an intermediate part in the width direction of a second fixed-side inner surface 42b, which is the other surface of both surfaces in the height direction of the inner surface of the fixed-side holder. Also, both end portions in the width direction of the second fixed-side inner surface 42b are formed with a pair of second fixed-side convex portions 43b, 43b, which are long in the axial direction and more protrude than the second fixed-side escape concave portion 49. The other structures of the fixed-side holder 30c are the same as the displacement-side holder 29 of the first example of the embodiment.

The fixed-side holder 30c having the above configuration is mounted with an outer peripheral surface thereof being internally fitted and fixed to the inner peripheral surface of the large-diameter cylinder part 44 formed at the inner part of the worm shaft accommodation part 20 (refer to FIG. 1) configuring the housing 3.

Both bimetals 31g, 31h have the same structure as the first example of the embodiment. That is, both bimetals 31g, 31h are formed by laminating two rectangular plate-shaped metal plates having different thermal expansion coefficients (a metal plate having a low thermal expansion coefficient and a metal plate having a high thermal expansion coefficient). When a reference temperature (20° C., in the fifth example) is set, both bimetals 31g, 31h are not deformed at the reference temperature and have a rectangular flat plate shape. In the fifth example, both bimetals 31g, 31h are disposed so that longitudinal directions of both bimetals 31g, 31h coincide with the width direction of the displacement-side holder 29c. Both bimetals 31g, 31h disposed in such a manner are bent so that centers in the width direction of one side surfaces 47g, 47h in the thickness direction of both bimetals 31g, 31h become convex surfaces and centers in the width direction of the other side surfaces 48g, 48h in the thickness direction become concave surfaces when the temperatures (surrounding temperature) of both bimetals 31g, 31h become higher than the reference temperature. On the other hand, both bimetals are bent so that the centers in the width direction of one side surfaces 47g, 47h in the thickness direction of both bimetals 31g, 31h become concave surfaces and the centers in the width direction of the other side surfaces 48g, 48h in the thickness direction become convex surfaces when the temperatures (surrounding temperature) of both bimetals 31g, 31h become lower than the reference temperature.

In the fifth example, both bimetals 31g, 31h are disposed differently from the first example of the embodiment. Specifically, one (an upper side in FIGS. 8 to 10 and a side distant from the worm wheel 5) bimetal 31g of both bimetals 31g, 31h is disposed in the mounting space 46a with one side surface 47g in the thickness direction facing the first fixed-side inner surface 39b of the fixed-side holder 30c and the other side surface 48g in the thickness direction facing the first displacement-side outer surface 33b of the displacement-side holder 29c. At this state, both end portions in the width direction of one side surface 47g in the thickness direction of the bimetal 31g are in contact with tip surfaces of both the first fixed-side convex portions 41b, 41b of the fixed-side holder 30c. In contrast, a central portion in the width direction of the other side surface 48g in the thickness direction of the bimetal 31g is in contact with a tip surface of the first displacement-side convex portion 34b of the displacement-side holder 29c.

Also, the other (a lower side in FIGS. 8 to 10 and a side close to the worm wheel 5) bimetal 31h of both bimetals 31g, 31h is disposed in the mounting space 46b with one side surface 47h in the thickness direction facing the second displacement-side outer surface 35b of the displacement-side holder 29c and the other side surface 48h in the thickness direction facing the second fixed-side inner surface 42b of the fixed-side holder 30c. At this state, a central portion in the width direction of one side surface 47h in the thickness direction of the bimetal 31h is in contact with a tip surface of the second displacement-side convex portion 37b of the displacement-side holder 29c. In contrast, both end portions in the width direction of the other side surface 48h in the thickness direction of the bimetal 31h are in contact with tip surfaces of both the second fixed-side convex portions 43b, 43b of the fixed-side holder 30c.

The states of the electric power steering device having the above configuration of the fifth example upon the operation are described. From the state (state of the reference temperature) shown in FIG. 8, when the temperatures of both bimetals 31g, 31h increase as the surrounding temperature increases, both bimetals 31g, 31h are deformed (bent) so that the centers in the width direction of one side surfaces 47g, 47h in the thickness direction become convex surfaces and the centers in the width direction of the other side surface 48g, 48h in the thickness direction become concave surfaces, as shown in FIG. 9. In the fifth example, both bimetals 31g, 31h are disposed to be bent in the same direction.

Figure 9:
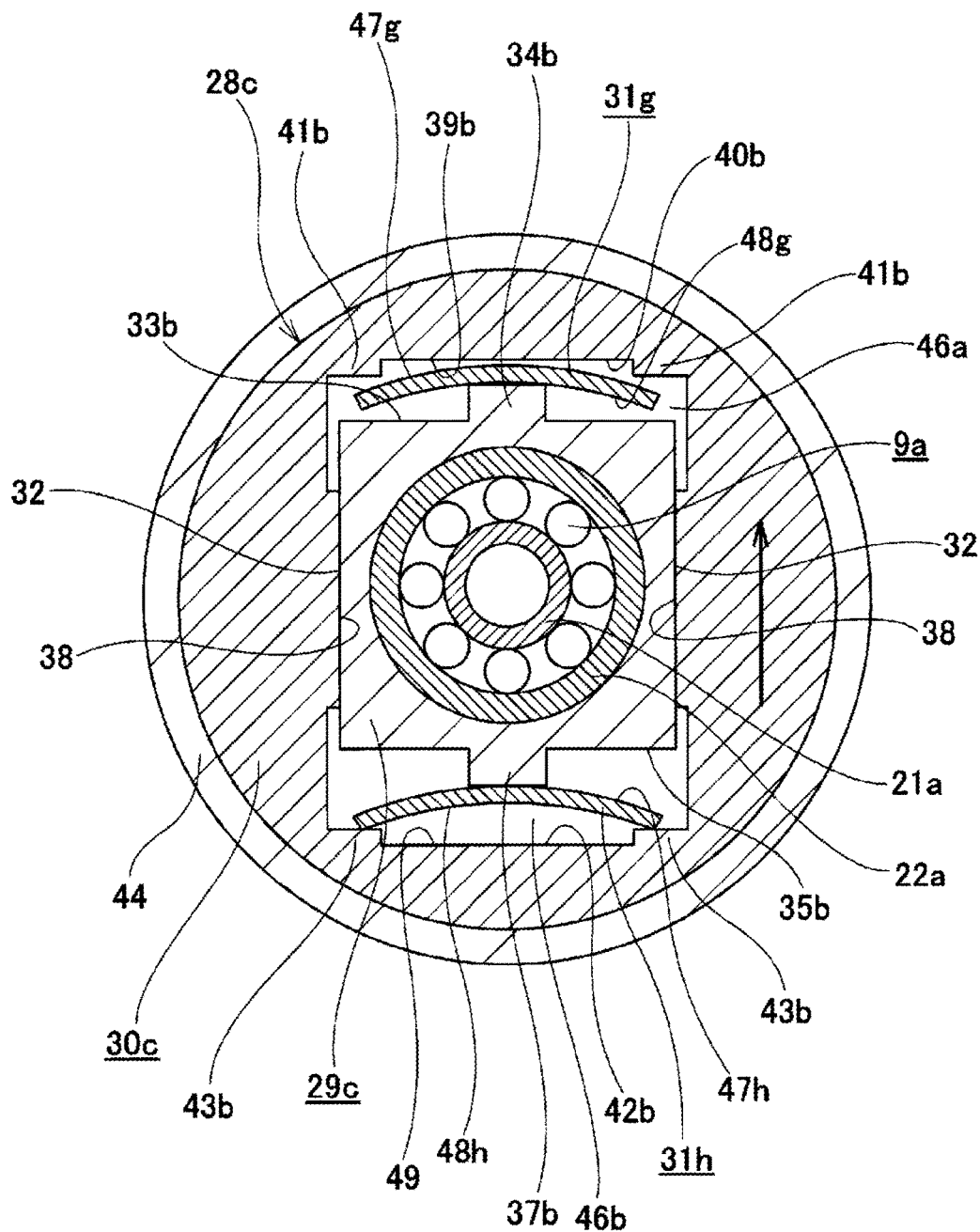
FIG. 9 is the same view as FIG. 2B, illustrating a state of the worm shaft when bimetal is deformed as the temperature increases.

At this state, both end portions in the width direction of the other side surface 48h in the thickness direction of the other bimetal 31h presses downward both the second fixed-side convex portions 43b, 43b of the second fixed-side inner surface 42b in FIG. 9. Then, since the fixed-side holder 30c is supported to the housing 3, the central portion in the width direction of one side surface 47h in the thickness direction of the other bimetal 31h presses upward the tip surface of the second displacement-side convex portion 37b of the displacement-side holder 29c in FIG. 9 by a reactive force based on the pressing. With the pressing, the displacement-side holder 29c is displaced upward in FIG. 9 by the deformation amount in the upper-lower direction of FIG. 9 of the other bimetal 31h with both oscillated guide surfaces 32, 32 of the displacement-side holder 29c being guided by both oscillation guide surfaces 38, 38 of the fixed-side holder 30c.

In the meantime, at the state of FIG. 9, the central portion in the width direction of one side surface 47g in the thickness direction of one bimetal 31g is located in the fixed-side escape concave portion 40b of the fixed-side holder 30c.

Figure 8:
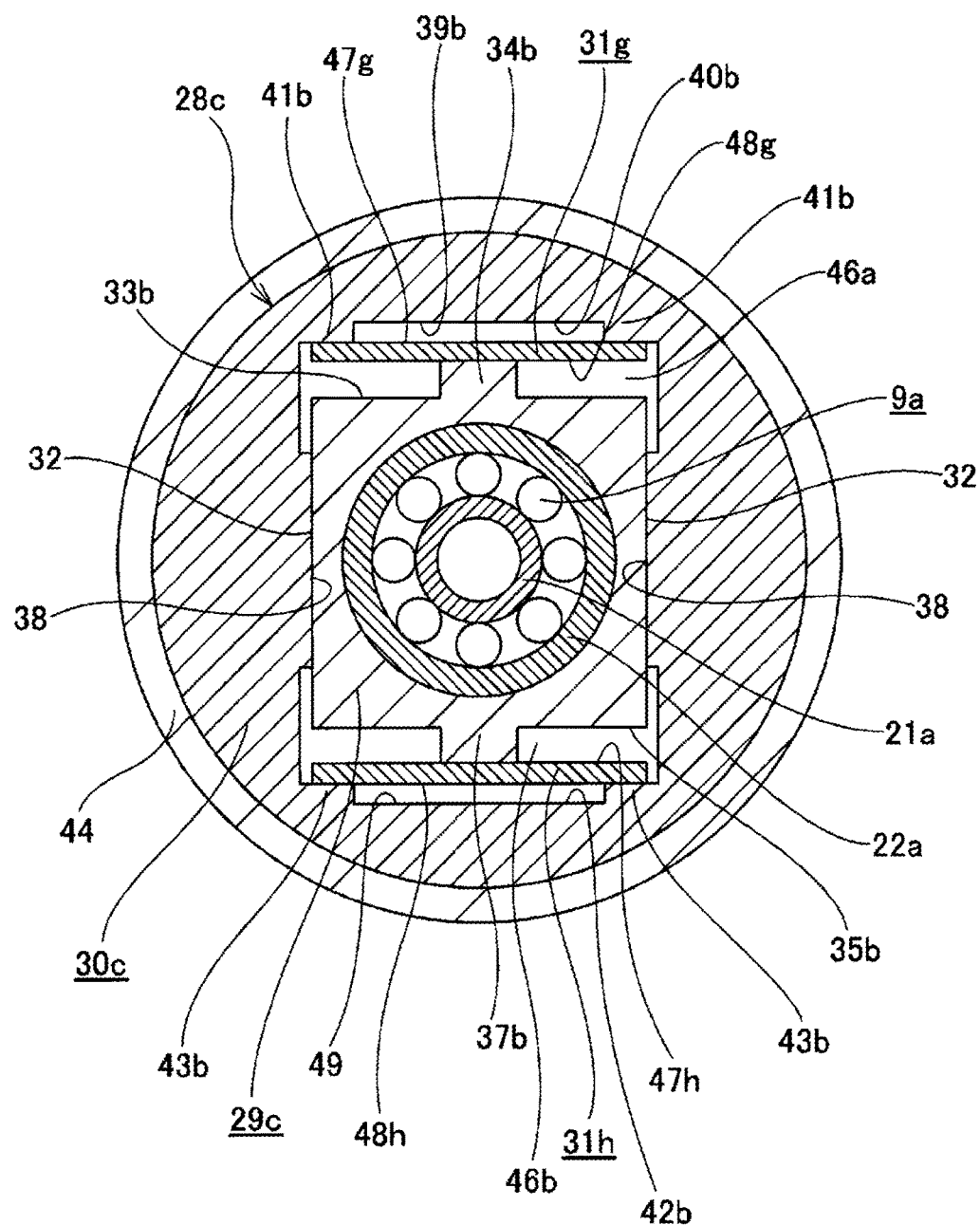
FIG. 8 is the same view as FIG. 1B, depicting a fifth example of the embodiment of the present invention.

In the meantime, from the state (state of the reference temperature) shown in FIG. 8, when the temperatures of both bimetals 31g, 31h decrease as the surrounding temperature decreases, both bimetals 31g, 31h are respectively bent so that the centers in the width direction of one side surfaces 47g, 47h in the thickness direction become concave surfaces and the centers in the width direction of the other side surfaces 48g, 48h in the thickness direction become convex surfaces.

Figure 10:
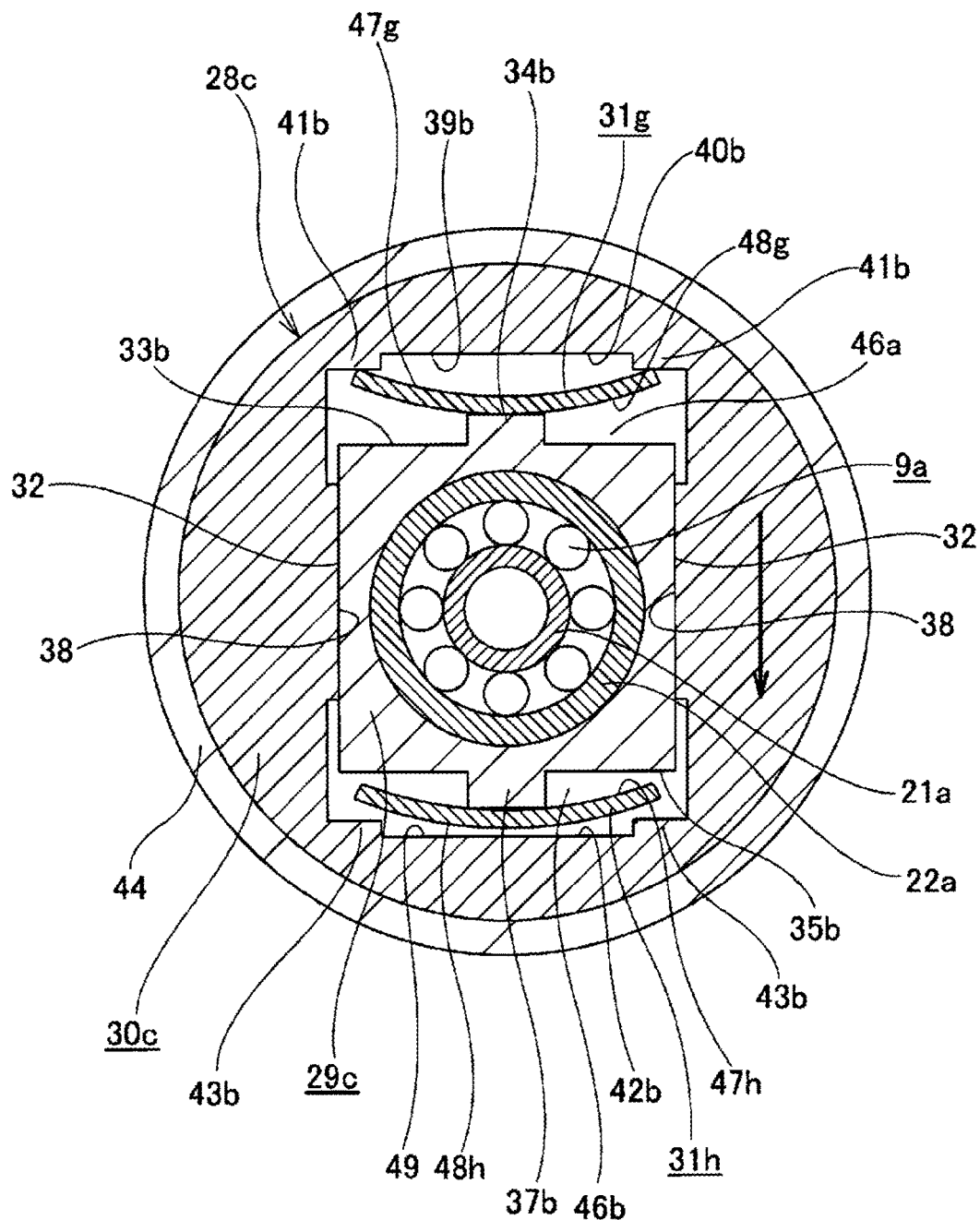
FIG. 10 is the same view as FIG. 3B, illustrating a state of the worm shaft when bimetal is deformed as the temperature decreases

At this state, both end portions in the width direction of one side surface 47g in the thickness direction of one bimetal 31g press upward both the first fixed-side convex portions 41b, 41b of the fixed-side holder 30c in FIG. 10. Then, since the fixed-side holder 30c is supported to the housing 3, the central portion in the width direction of the other side surface 48g in the thickness direction of one bimetal 31g presses downward the tip surface of the first displacement-side convex portion 34b of the displacement-side holder 29c in FIG. 10 by a reactive force based on the pressing. With the pressing, the displacement-side holder 29c is displaced downward in FIG. 10 by the deformation amount in the upper-lower direction of FIG. 10 of one bimetal 31g with both oscillated guide surfaces 32, 32 of the displacement-side holder 29c being guided by both oscillation guide surfaces 38, 38 of the fixed-side holder 30c.

Meanwhile, at the state of FIG. 10, the central portion in the width direction of the other side surface 48h in the thickness direction of the other bimetal 31h is located in the second fixed-side escape concave portion 49 of the fixed-side holder 30c.

The other configurations and operational effects are the same as the first example of the embodiment.

Sixth Example of Embodiment

A sixth example of the embodiment of the present invention is described with reference to FIGS. 11 to 13. In the sixth example, the tip-side shaft part 27 provided at the tip portion (a left end portion in FIG. 11) of the worm shaft 6a is supported to the inner part (a left end portion in FIG. 11) of the worm shaft accommodation part 20 via the rolling bearing 9a and an oscillation pressing mechanism 50 provided at an outer diameter-side of the rolling bearing 9a so that it can rotate relative to the housing 3. Specifically, the outer peripheral surface of the tip-side shaft part 27 is internally fitted and fixed to the inner peripheral surface of the inner ring 21a configuring the rolling bearing 9a by interference fit, and the outer ring 22a configuring the rolling bearing 9a is internally fitted and fixed to the inner peripheral surface of the displacement-side holder 29 configuring the oscillation pressing mechanism 50, which will be described later.

The oscillation pressing mechanism 50 has the displacement-side holder 29, the fixed-side holder 30, a pressing member 51 and a bimetal 31.

The displacement-side holder 29 is made of a synthetic resin having sufficient strength, stiffness, heat resistance and oil resistance such as a high function resin, and has a cylinder shape of which both axial ends are opened. A sectional shape of the outer peripheral surface of the displacement-side holder 29 with respect to the virtual plane orthogonal to the central axis of the worm shaft 6a is substantially rectangular, and a sectional shape of the inner peripheral surface of the displacement-side holder 29 with respect to the virtual plane is circular.

Also, both surfaces (both surfaces in the left-right direction in FIG. 11B) in the width direction of the displacement-side holder 29 of an outer surface of the displacement-side holder 29 are formed as flat surfaces and are configured as a pair of oscillated guide surfaces 32, 32.

Also, both surfaces (both surfaces in the upper-lower direction of FIG. 11B) in a height direction of the outer surface of the displacement-side holder 29 are all formed as flat surfaces, and one surface (an upper surface in FIG. 11B) of both surfaces is configured as a first displacement-side outer surface 33 and the other surface is configured as a second displacement-side outer surface 35.

The displacement-side holder 29 having the above configuration is mounted with an inner peripheral surface thereof being externally fitted and fixed to the outer peripheral surface of the outer ring 22a configuring the rolling bearing 9a by interference fit.

Like the displacement-side holder 29, the fixed-side holder 30 is made of a synthetic resin having sufficient strength, stiffness, heat resistance and oil resistance such as a high function resin, and has a cylinder shape of which both axial ends are opened. Also, a sectional shape of the outer peripheral surface of the fixed-side holder 30 with respect to the virtual plane orthogonal to the central axis of the worm shaft 6a is circular, and a sectional shape of the inner peripheral surface of the fixed-side holder 30 with respect to the virtual plane is substantially rectangular. In the meantime, the fixed-side holder 30 may be made of a material different from the displacement-side holder 29.

Also, intermediate parts in a height direction of both surfaces in the width direction of the fixed-side holder 30 of an inner surface of the fixed-side holder 30 are formed as flat surfaces more protruding inward in the width direction than the other parts and are configured as a pair of oscillation guide surfaces 38, 38.

Also, an intermediate part in the width direction of the first fixed-side inner surface 39, which is one surface (an upper surface in FIG. 11B) of both surfaces in the height direction of the inner surface of the fixed-side holder 30, is formed with a fixed-side escape concave portion 40 that is long in the axial direction, and both end portions in the width direction of the first fixed-side inner surface 39 are formed with a pair of first fixed-side convex portions 41a, 41b, which are long in the axial direction and more protrude than a bottom surface of the fixed-side escape concave portion 40.

In contrast, the second fixed-side inner surface 42, which is the other surface (a lower surface in FIG. 11B) of both surfaces in the height direction of the inner surface of the fixed-side holder 30, is formed as a flat surface.

The fixed-side holder 30 having the above configuration is mounted with the outer peripheral surface thereof being internally fitted and fixed to the inner peripheral surface of the large-diameter cylinder part 44 formed at the inner part (a left end portion in FIG. 11) of the worm shaft accommodation part 20 configuring the housing 3.

At the mounted state as described above, one axial end surface of the fixed-side holder 30 is in contact with the stepped portion 45 configured to continue the large-diameter cylinder part 44 configuring the worm shaft accommodation part 20 and the part located at one axial side beyond the large-diameter cylinder part 44.

Also, both oscillation guide surfaces 38, 38 of the fixed-side holder 30 are in contact with both oscillated guide surfaces 32, 32 of the displacement-side holder 29. Also, the first fixed-side inner surface 39 of the fixed-side holder 30 faces the first displacement-side outer surface 33 of the displacement-side holder 29, and a mounting space 46 for mounting therein the pressing member 51 and the bimetal 31 (which will be described later) is formed between both the surfaces 38, 34. In the meantime, the second fixed-side inner surface 42 of the fixed-side holder 30 faces the second displacement-side outer surface 35 of the displacement-side holder 29 with a radial gap being interposed therebetween. In the meantime, a radial size of the gap between the second displacement-side outer surface 35 and the second fixed-side inner surface 42 is appropriately determined depending on using situations.

The pressing member 51 is a compression coil spring and has one end portion (an end portion opposite to the worm shaft 6a) supported to a central portion of a side surface, which faces toward the worm shaft 6a, of both side surfaces of the bimetal 31 (which will be described later). In the meantime, the other end portion (an end portion of the worm shaft 6a) of the pressing member 51 is supported to a central portion of the first displacement-side outer surface 33 configuring the displacement-side holder 29. At a mounted state of FIG. 11, the pressing member 51 having the above configuration is mounted between the first displacement-side outer surface 33 and the bimetal 31 with an axial size thereof being elastically contracted (the elastic force being kept). At this state, the pressing member 51 is configured to urge the tip portion of the worm shaft 6a toward the worm wheel 5 by a predetermined pressing force. In the meantime, a means for supporting one end portion of the pressing member 51 to the side surface of the bimetal 31 facing toward the worm shaft 6a and a means for supporting the other end portion of the pressing member 51 to the first displacement-side outer surface 33 are not particularly limited.

The bimetal 31 is a member corresponding to the composite metal member of the claims, and is formed by laminating two rectangular plate-shaped metal plates having different thermal expansion coefficients (a metal plate having a low thermal expansion coefficient and a metal plate having a high thermal expansion coefficient). When a reference temperature (20° C., in the sixth example) is set, the bimetal 31 is not deformed at the reference temperature and has a flat plate shape. In the sixth example, the bimetal 31 is disposed so that a longitudinal direction of the bimetal 31 coincides with the width direction (a left-right direction in FIG. 11B) of the displacement-side holder 29. The bimetal 31 disposed in such a manner is bent so that a center in the width direction of one side surface 47 in the thickness direction of the bimetal 31 becomes a convex surface and a center in the width direction of the other side surface 48 in the thickness direction becomes a concave surface when the temperature (surrounding temperature) of the bimetal 31 becomes higher than the reference temperature. On the other hand, the bimetal is bent so that the center in the width direction of one side surface 47 in the thickness direction of the bimetal 31 becomes a concave surface and the center in the width direction of the other side surface 48 in the thickness direction becomes a convex surface when the temperature (surrounding temperature) of the bimetal 31 becomes lower than the reference temperature. That is, the bimetal 31 is configured to be bent (deformed) in the opposite directions when the temperature of the bimetal 31 is higher and lower than the reference temperature. In the meantime, as the structure and the material of the bimetal 31, a variety of well-known structures and materials can be adopted within a range satisfying the above-described conditions. As the specific materials, Ni—Fe alloy may be used as a material of the metal plate having the low thermal expansion coefficient. In the meantime, Ni, Zn—Cu alloy, Ni—Cr—Fe alloy, Ni—Mn—Fe alloy, Ni—Mo—Fe alloy, Cu—Ni—Mn alloy or the like may be used as a material of the metal plate having the high thermal expansion coefficient, depending on using temperature ranges or the like.

The bimetal 31 having the above configuration is disposed in the mounting space 46 with one side surface 47 in the thickness direction facing the first fixed-side inner surface 39 of the fixed-side holder 30 and the other side surface 48 in the thickness direction facing the first displacement-side outer surface 33 of the displacement-side holder 29. At this state, both end portions in the width direction of one side surface 47 in the thickness direction of the bimetal 31 are in contact with both tip surfaces of both the first fixed-side convex portions 41a, 41b of the fixed-side holder 30. In contrast, the other end portion of the pressing member 51 is supported to a central portion in the width direction of the other side surface 48 in the thickness direction of the bimetal 31.

The states of the electric power steering device having the above configuration of the sixth example upon the operation are described with reference to FIGS. 11 to 13.

Figure 11:
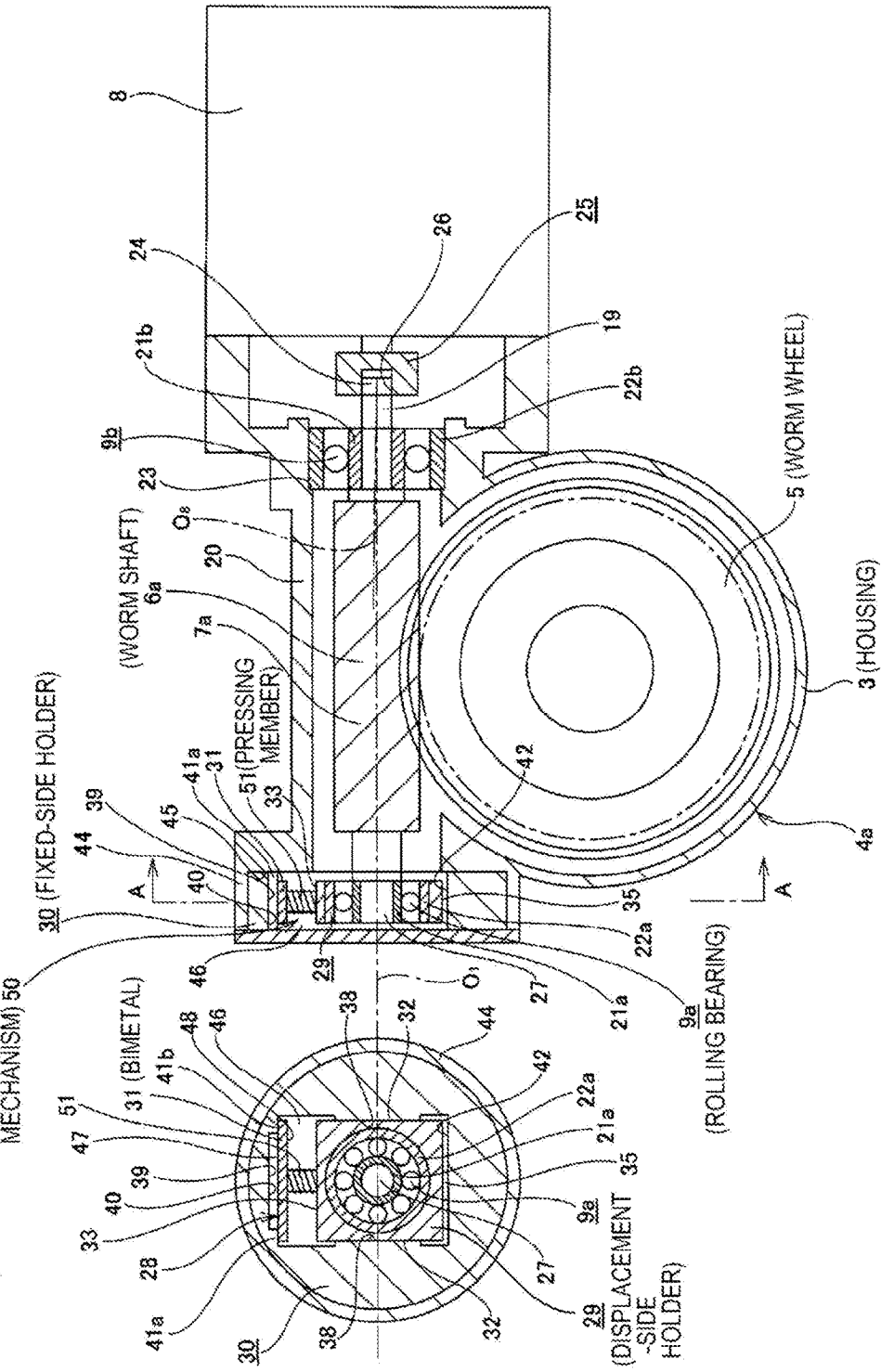
FIGS. 11A and 11B are the same views as FIGS. 1A and 1B, depicting a sixth example of the embodiment of the present invention.

First, FIG. 11 depicts a state where the bimetal 31 is at the reference temperature (20° C., in the sixth example). At this state, since the pressing member 51 urges the tip portion of the worm shaft 6a toward the worm wheel 5 by a predetermined pressing force (reference pressing force), the backlash of the meshing part between the worm teeth 7a of the worm shaft 6a and the worm wheel 5 is adjusted to the reference backlash amount.

Meanwhile, at the state of FIG. 11, when the central axis of the worm shaft 6a is denoted with a reference central axis $O_1$, the reference central axis oscillates and is displaced toward the worm wheel 5 by a predetermined angle with respect to a central axis $O_8$ of the electric motor 8. Also, at the state of FIG. 11, the bimetal 31 has a flat plate shape without being deformed.

Figure 12:
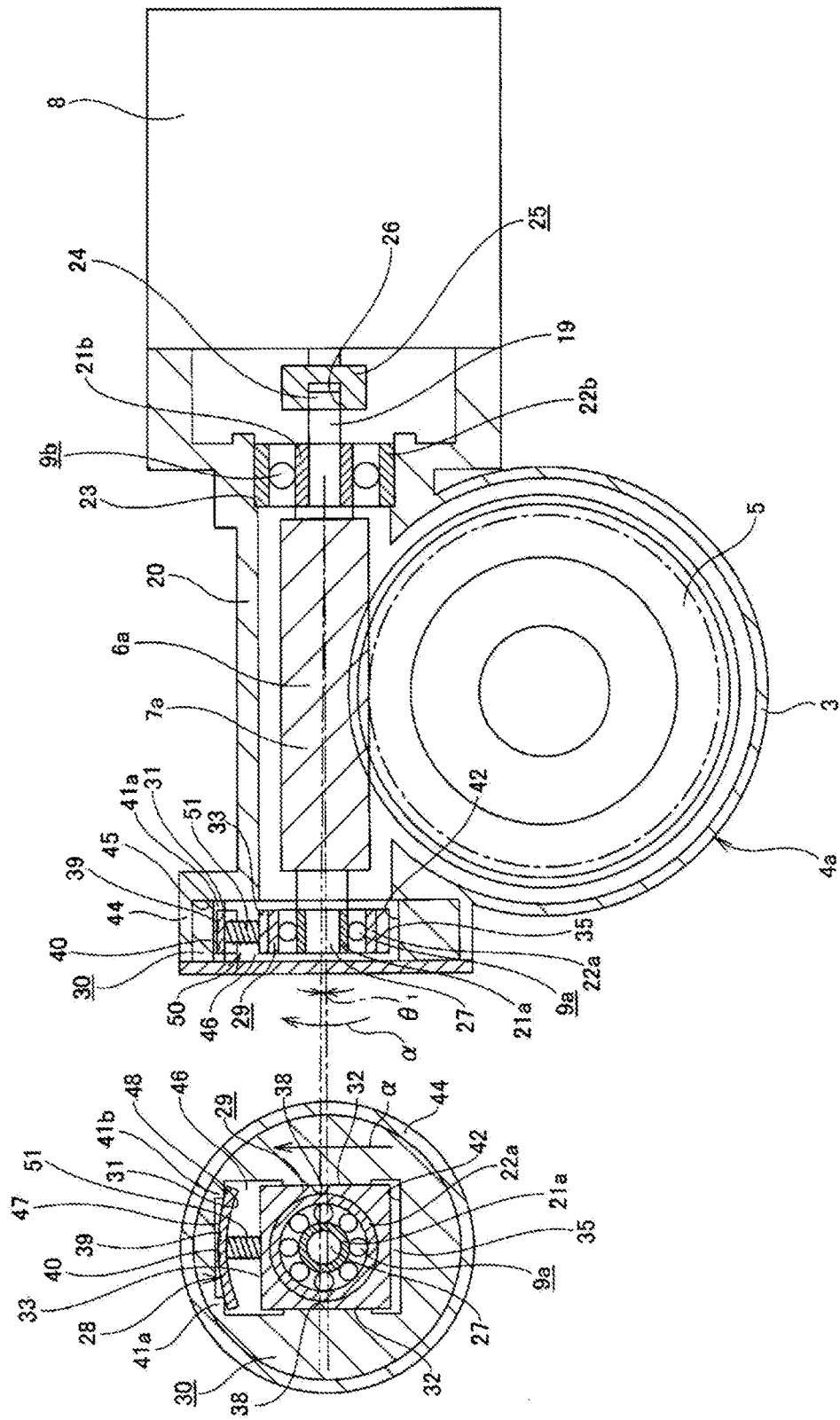
FIGS. 12A and 12B are the same views as FIGS. 11A and 11B, illustrating a state of the worm shaft when bimetal is deformed as the temperature increases.

From the state of FIG. 11, when the surrounding temperature increases, the worm wheel 5 is thermally expanded in association with the increase in temperature, so that the worm wheel 5 presses the worm shaft 6a away from the worm wheel 5 (toward the upper in FIGS. 11 and 12), as shown in FIG. 12. Then, the worm shaft 6a oscillates and is displaced away from the worm wheel 5 (refer to a direction denoted with an arrow a in FIG. 12). Also, in association with the oscillation and displacement, the displacement-side holder 29 externally fitted and fixed to the worm shaft 6a is also displaced away from the worm wheel 5 with both oscillated guide surfaces 32, 32 of the displacement-side holder 29 being guided by both oscillation guide surfaces 38, 38 of the fixed-side holder 30.

When the worm shaft 6a and the displacement-side holder 29 are displaced as described above, if a position of one end portion (an upper end portion in FIG. 11) of the pressing member 51 is not changed from the position of FIG. 11, a position of the other end portion of the pressing member 51 is displaced away from the worm wheel 5 in association with the displacement of the displacement-side holder 29, so that an axial length size of the pressing member 51 is reduced (contracted). Then, an elastic force (spring force) of the pressing member 51 becomes higher than the state of FIG. 11. As a result, the pressing force by which the pressing member 51 presses the tip portion of the worm shaft 6a toward the worm wheel 5 becomes higher than the reference pressing force at the state of FIG. 11.

In the meantime, in the sixth example, when the worm wheel 5 is thermally expanded as the surrounding temperature increases, the temperature of the bimetal 31 also increases and the bimetal is deformed (bent) so that a center in the width direction of one side surface 47 in the thickness direction, which is a side surface facing the fixed-side holder 30, of side surfaces of the bimetal 31 becomes a convex surface and a center in the width direction of the other side surface 48 in the thickness direction, which is a side surface facing the displacement-side holder 29, becomes a concave surface.

At the deformed state as described above, the central portion in the width direction of one side surface 47 in the thickness direction of the bimetal 31 is displaced away from the worm wheel 5 and is located in the fixed-side escape concave portion 40 of the fixed-side holder 30. With this, the central portion in the width direction of the other side surface 48 in the thickness direction of the bimetal 31 is also displaced away from the worm wheel 5. Then, one end portion of the pressing member 51 supported to the other side surface 48 in the thickness direction of the bimetal 31 is also displaced away from the worm wheel 5. In the meantime, a displacement amount of one end portion of the pressing member 51 in the above direction is determined by the deformation amount of the bimetal 31. The deformation amount of the bimetal 31 due to the change in temperature is appropriately determined to be the same or substantially the same (an amount within a predetermined range) as a displacement amount that the other end portion of the pressing member 51 is displaced away from the worm wheel 5 when the worm wheel 5 is thermally expanded due to the change in temperature.

Like this, according to the sixth example, even when the surrounding temperature increases and the state is thus changed from the state of FIG. 11 to the state of FIG. 12, the pressing member 51 is not contracted, as compared to the state of FIG. 11. Specifically, even when the other end portion of the pressing member 51 is displaced away from the worm wheel 5 upon the thermal expansion of the worm wheel 5 due to the change in temperature, since the bimetal 31 is deformed in the above-described manner, the other end portion of the pressing member 51 is also displaced away from the worm wheel 5. In the sixth example, the displacement amount of the other end portion of the pressing member 51 and the displacement amount of one end portion of the pressing member 51 are regulated to be the same or to be substantially the same. For this reason, the axial length size of the pressing member 51 does not change, and even when it changes, it is a slight change of which a change amount is within a predetermined range.

In contrast, when the surrounding temperature decreases from the state of FIG. 11, the worm wheel 5 is contracted in association with the temperature decrease. Then, as shown in FIG. 13, the worm shaft 6a is enabled to oscillate and be displaced toward the worm wheel 5 (a direction denoted with β in FIG. 13) by a predetermined angle θ2 by the pressing force of the pressing member 51. Also, with the oscillation and displacement, the displacement-side holder 29 externally fitted and fixed to the worm shaft 6a is displaced toward the worm wheel 5 with both oscillated guide surfaces 32, 32 of the displacement-side holder 29 being guided by both oscillation guide surfaces 38, 38 of the fixed-side holder 30. Meanwhile, in the sixth example, at the state of FIG. 13, the second displacement-side outer surface 35 of the displacement-side holder 29 and the second fixed-side inner surface 42 of the fixed-side holder 30 are in contact with each other. At the state where the second displacement-side outer surface 35 and the second fixed-side inner surface 42 are in contact with each other, the displacement-side holder 29 is not further displaced toward the worm wheel 5.

When the displacement-side holder 29 is displaced as described above, if the position of one end portion of the pressing member 51 does not change from the position of FIG. 11, the position of the other end portion of the pressing member 51 is displaced toward the worm wheel 5 in association with the displacement of the displacement-side holder 29, so that the axial length size of the pressing member 51 is increased (expanded). Then, the elastic force (spring force) of the pressing member 51 becomes lower than the state of FIG. 11. As a result, the pressing force by which the pressing member 51 presses the tip portion of the worm shaft 6a toward the worm wheel 5 becomes lower than the reference pressing force at the state of FIG. 11.

Figure 13:
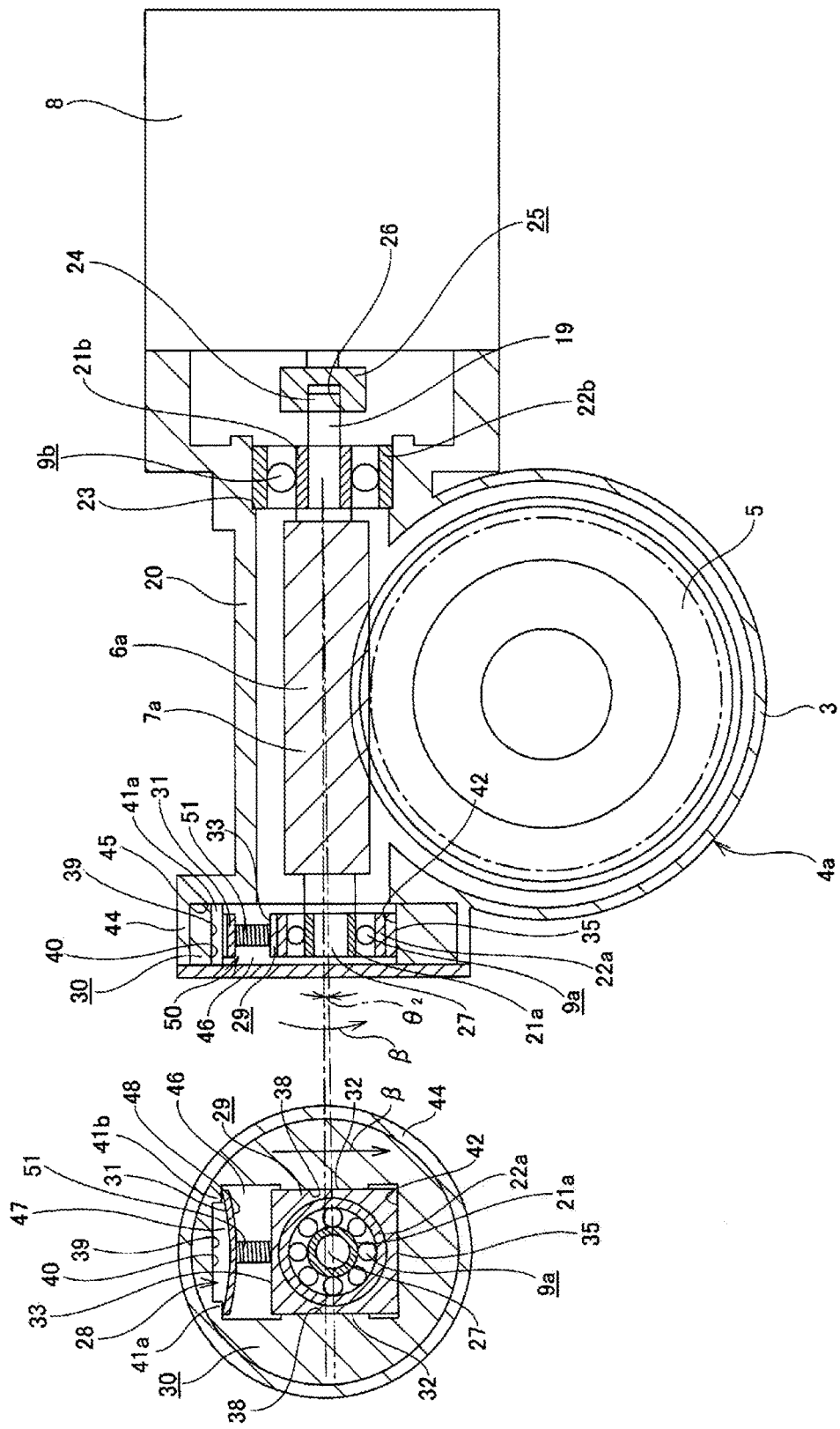
FIGS. 13A and 13B are the same views as FIGS. 11A and 11B, illustrating a state of the worm shaft when bimetal is deformed as the temperature decreases.

On the other hand, in the sixth example, when the worm wheel 5 is contracted as the surrounding temperature decreases, the temperature of the bimetal 31 correspondingly decreases and is deformed (bent) so that the center in the width direction of the other side surface 48 in the thickness direction, which is a side surface facing the displacement-side holder 29, of the side surfaces of the bimetal 31 becomes a convex surface and the center in the width direction of one side surface 47 in the thickness direction, which is a side surface facing the fixed-side holder 30, becomes a concave surface, as shown in FIG. 13.

At the deformed state as described above, both end portions in the width direction of one side surface 47 in the thickness direction of the bimetal 31 press (contact) upward both the first fixed-side convex portions 41a, 41b of the fixed-side holder 30 in FIG. 13. Then, since the fixed-side holder 30 is supported to the housing 3, the central portion in the width direction of the other side surface 48 in the thickness direction of the bimetal 31 presses (displaces) downward one end portion of the pressing member 51 by a reactive force based on the pressing, in FIG. 13. Then, one end portion of the pressing member 51 supported to the other side surface 48 in the thickness direction of the bimetal 31 is also displaced away from the worm wheel 5.

Like this, according to the sixth example, even when the surrounding temperature decreases and the state is thus changed from the state of FIG. 11 to the state of FIG. 13, the pressing member 51 is not contracted, as compared to the state of FIG. 11. Specifically, even when the other end portion of the pressing member 51 is displaced toward the worm wheel 5 upon the contraction of the worm wheel 5 due to the change in temperature, since the bimetal 31 is deformed in the above-described manner, the other end portion of the pressing member 51 is also displaced toward the worm wheel 5. In the sixth example, the displacement amount of the other end portion of the pressing member 51 and the displacement amount of one end portion of the pressing member 51 are regulated to be the same or to be substantially the same. For this reason, the axial length size of the pressing member 51 does not change, and even when it changes, it is a slight change of which a change amount is within a predetermined range.

According to the electric power steering device having the above configuration of the sixth example, it is possible to keep the pressing force by which the worm shaft 6a is to be pressed toward the worm wheel 5 to the appropriate magnitude (the reference pressing force), irrespective of the expansion and contraction of the worm wheel 5.

That is, in the sixth example, it is possible to keep the axial size of the pressing member 51 constant or substantially constant even when the temperatures of the worm wheel 5 and the bimetal 31 become higher or lower than the reference temperature. For this reason, it is possible to keep the pressing force (spring force) by which the pressing member 51 is to press the worm shaft 6a toward the worm wheel 5 and the backlash of the meshing part between the worm shaft 6a and the worm wheel 5 to the appropriate magnitudes. As a result, it is possible to prevent the frictional force of the meshing part from increasing and the gear-tooth striking sound from being generated.

Seventh Example of Embodiment

Figure 14:
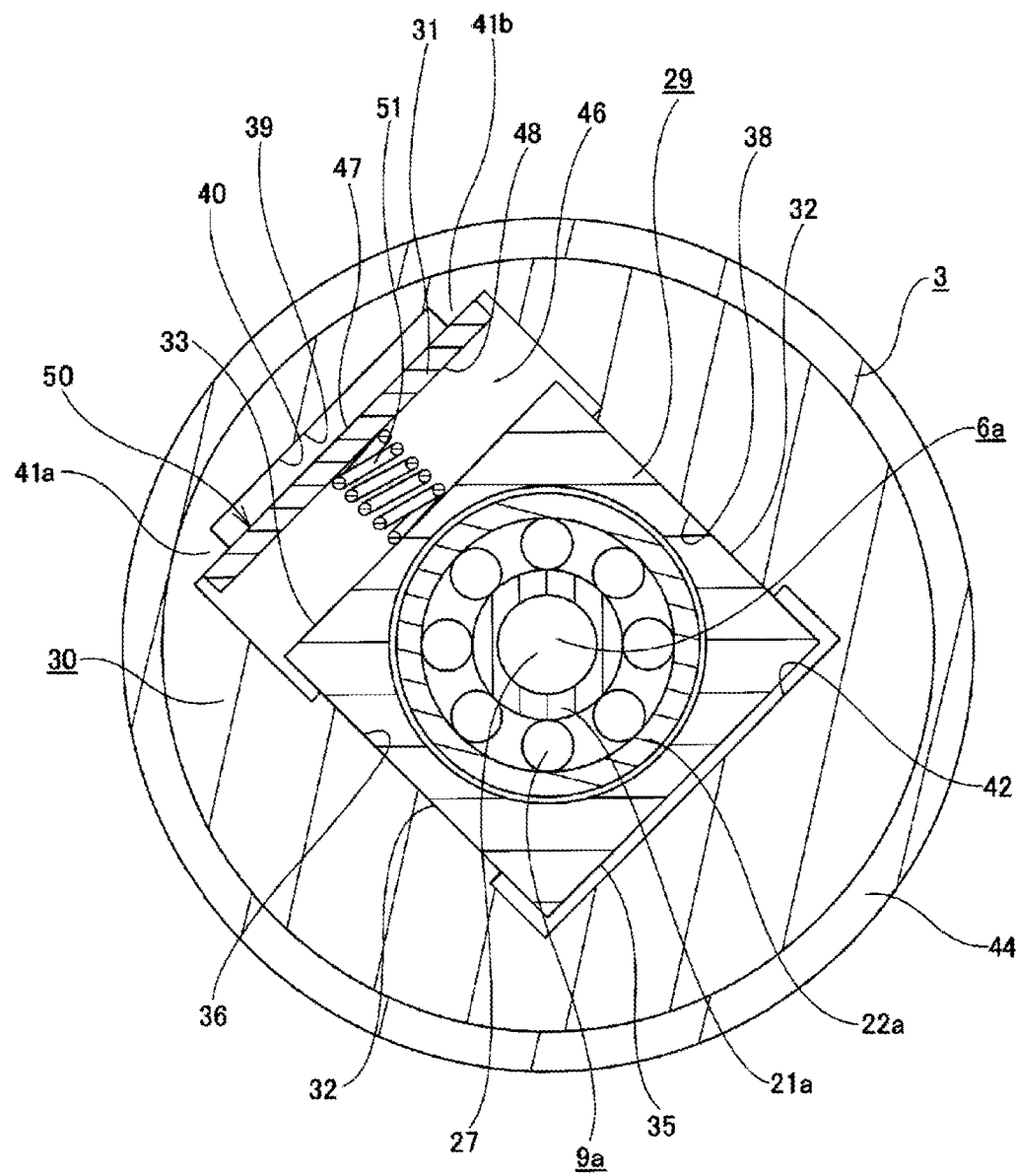
FIG. 14 is the same view as FIG. 11B, depicting a second example of the embodiment of the present invention.

A seventh example of the embodiment of the present invention is described with reference to FIG. 14. According to the electric power steering device of the seventh example, the oscillation pressing mechanism 50 having the same configuration as the sixth example of the embodiment is mounted between the tip-side shaft part 27 of the worm shaft 6a and the large-diameter cylinder part 44 formed at the inner side of the housing 3 via the rolling bearing 9a with being rotated by 45° in one circumferential direction (a counterclockwise direction of FIGS. 11B, 12B, 13B and 14), as compared to the sixth example of the embodiment. Therefore, when the surrounding temperature increases or decreases, the displacement direction of the displacement-side holder 29 and the oscillation direction of the worm shaft 6a are also rotated by 45° with respect to the sixth example of the embodiment.

As described above, the angle by which the oscillation mechanism 50 is to be rotated is arbitrarily set, so that it is possible to arbitrarily set the displacement direction of the displacement-side holder 29 and the oscillation direction of the worm shaft 6a. The other configurations and effects are the same as the first example of the embodiment. The other configurations and operational effects are the same as the sixth example of the embodiment.

The subject application is based on a Japanese Patent Application No. 2014-252881 filed on Dec. 15, 2014, which is herein incorporated by reference.

INDUSTRIAL APPLICABILITY

As described above, when implementing the present invention, the configuration where the pair of bimetals is to be symmetrically deformed with respect to the central axis of the worm shaft or the configuration where the pair of bimetals is to be deformed in the same direction may be adopted.

Also, when implementing the present invention, the configuration where both bimetals are disposed so that the longitudinal directions of both bimetals coincide with the width direction of the displacement-side holder may be adopted. In this case, both bimetals may be disposed so that the sectional shape with respect to the virtual plane orthogonal to the central axis of the worm shaft is bent so that the central portion in the width direction of the displacement-side holder becomes a convex surface or a concave surface when the temperature changes.

Also, when implementing the present invention, the configuration where both bimetals are disposed so that the longitudinal directions of both bimetals coincide with the axial direction of the worm shaft may be adopted. In this case, both bimetals may be bent so that the sectional shape with respect to the virtual plane orthogonal to the central axis of the worm shaft has such a shape that the axially central portion of the worm shaft becomes a convex surface or a concave surface. In the meantime, the shape of the bimetal is not limited to the respective examples of the embodiment.

Also, the positions and numbers of the convex portions provided on the outer surface of the displacement-side holder and the convex portions provided on the inner surface of the fixed-side holder are not limited to the respective examples of the embodiment.

Also, when implementing the present invention, a pressing mechanism for pressing the worm shaft to the worm wheel in advance (for applying a preload to the meshing part between the worm teeth and the worm wheel) may also be adopted, like the elasticity applying means 18 (refer to FIG. 16) of the first example of the embodiment.

Also, when implementing the present invention, the reference temperature is a temperature upon switch of the oscillation direction of the worm shaft and is appropriately determined with a relation with the thermal expansion coefficient of the worm wheel. Therefore, the deformation aspect of the composite metal member at the reference temperature is not particularly problematic. For example, the composite metal member may be deformed (bent) so as to apply the pressing force of a direction toward the worm wheel to the worm shaft at the reference temperature.

Also, in the respective examples of the embodiment, the present invention has been applied to the column assist-type electric power steering device. However, the present invention can also be applied to a variety of electric power steering devices such as a pinion assist-type electric power steering device.

DESCRIPTION OF REFERENCE NUMERALS

1: steering wheel, 2: steering shaft, 3: housing, 4, 4a: worm decelerator, 5: worm wheel, 6, 6a, 6b: worm shaft, 7, 7a, 7b: worm teeth, 8: electric motor, 9a, 9b: rolling bearing, 10: rotary shaft, 11a, 11b: rolling bearing, 12: torsion bar, 13: torque sensor, 14a, 14b: universal joint, 15: intermediate shaft, 16: steering gear unit, 17: input shaft, 18: elasticity applying means, 19: base end-side shaft part, 20: worm shaft accommodation part, 21a, 21b: inner ring, 22a, 22b: outer ring, 23: stepped portion, 24: male spline part, 25: joint, 26: female spline part, 27: tip-side shaft part, 28, 28a, 28b, 28c: oscillation mechanism, 29, 29a, 29b, 29c: displacement-side holder, 30, 30a, 30b, 30c: fixed-side holder, 31, 31a, 31b, 31c, 31d, 31e, 31f, 31g, 31h: bimetal, 32: oscillated guide surface, 33, 33a, 33b: first displacement-side outer surface, 34, 34a, 34b: first displacement-side convex portion, 35, 35a, 35b: second displacement-side outer surface, 36, 36a: displacement-side escape concave portion, 37, 37a, 37b: second displacement-side convex portion, 38: oscillation guide surface, 39, 39a, 39b: first fixed-side inner surface, 40, 40a, 40b: fixed-side escape concave portion, 41, 41a, 41b: first fixed-side convex portion, 42, 42a, 42b: second fixed-side inner surface, 43, 43a, 43b: second fixed-side convex portion, 44: large-diameter cylinder part, 45: stepped portion, 46, 46a, 46b: mounting space, 47, 47a, 47b, 47c, 47d, 47e, 47f, 47g, 47h: one side surface, 48, 48a, 48b, 48c, 48d, 48e, 48f, 48g, 48h: other side surface, 49: second fixed-side escape concave portion, 50: oscillation pressing mechanism, 51: pressing member

The invention claimed is:

1. An electric power steering device comprising:
a housing fixed to a fixed part so as not to rotate;
a rotary shaft for steering rotatably provided to the housing and configured to rotate in accordance with an operation of a steering wheel and to apply a steering angle to steered wheels by the rotation;
a worm wheel supported to a part of the rotary shaft for steering concentrically with the rotary shaft for steering within the housing and configured to rotate together with the rotary shaft for steering;
a worm shaft comprises worm teeth provided on an axially intermediate part, the worm shaft of which parts being rotatably supported to the housing by bearings with the worm teeth being meshed with the worm wheel;
an electric motor provided to rotate the worm shaft;
a composite metal member formed by laminating a plurality of metal plates having different thermal expansion coefficients, the composite metal member being capable of causing the worm shaft to oscillate and be displaced away from the worm wheel on the basis of deformation of the composite metal member when a temperature thereof becomes higher than a reference temperature, the composite metal member being capable of causing the worm shaft to oscillate and be displaced toward the worm wheel on the basis of deformation of the composite metal member when the temperature thereof becomes lower than the reference temperature; and
a pressing member pressing the worm shaft toward the worm wheel,
wherein the composite metal member is provided between an end portion of the pressing member, which is opposite to the worm shaft, and an inner peripheral surface of the housing,
wherein the composite metal member is capable of being deformed in a direction and, when deformed in the direction, suppresses an increase to a magnitude of a pressing force when a temperature thereof becomes higher than the reference temperature, the pressing force being by which the pressing member is to press the worm shaft toward the worm wheel, and
wherein the composite metal member is further capable of being deformed in the direction, and, when deformed in the direction, suppresses a decrease to the magnitude of the pressing force when the temperature thereof becomes lower than the reference temperature.

2. The electric power steering device according to claim 1,
wherein the composite metal member is deformed in a direction in which a position of an end portion of the pressing member opposite to the worm shaft is displaced away from the worm shaft if the temperature thereof becomes higher than the reference temperature, as compared to a case where the temperature thereof is the reference temperature, and
wherein the composite metal member is deformed in a direction in which the position of the end portion of the pressing member opposite to the worm shaft is permitted to be displaced toward the worm shaft if the temperature thereof becomes lower than the reference temperature, as compared to the case where the temperature thereof is the reference temperature.

3. The electric power steering device according to claim 1,
wherein the composite metal member and the pressing member are held by a holder.

4. An electric power steering device comprising:
a housing fixed to a fixed part so as not to rotate;
a rotary shaft for steering rotatably provided to the housing and configured to rotate in accordance with an operation of a steering wheel and to apply a steering angle to steered wheels by the rotation;
a worm wheel supported to a part of the rotary shaft for steering concentrically with the rotary shaft for steering within the housing and configured to rotate together with the rotary shaft for steering;
a worm shaft comprises worm teeth provided on an axially intermediate part, the worm shaft of which parts being rotatably supported to the housing by bearings with the worm teeth being meshed with the worm wheel;

an electric motor provided to rotate the worm shaft; and a composite metal member formed by laminating a plurality of metal plates having different thermal expansion coefficients, the composite metal member being capable of causing the worm shaft to oscillate and be displaced away from the worm wheel on the basis of deformation of the composite metal member when a temperature thereof becomes higher than a reference temperature, the composite metal member being capable of causing the worm shaft to oscillate and be displaced toward the worm wheel on the basis of deformation of the composite metal member when the temperature thereof becomes lower than the reference temperature;

wherein an other composite metal member is held at a radially opposite part of the worm shaft by a holder as compared to the composite metal member, wherein a first of the composite metal member and the other composite metal member, which is closer to the worm wheel than a second of the composite metal member and the other composite metal member, is configured to cause the worm shaft to oscillate and be displaced away from the worm wheel on the basis of deformation of the composite metal member when the temperature thereof becomes higher than the reference temperature, and wherein the second of the composite metal member and the other composite metal member, which is more distant from the worm wheel than the first of the composite metal member and the other composite metal member, is configured to cause the worm shaft to oscillate and be displaced toward the worm wheel on the basis of deformation of the composite metal member when the temperature thereof becomes lower than the reference temperature.

5. The electric power steering device according to claim 4, wherein when the first of the composite metal member and the other composite metal member applies to the worm shaft one pressing force for causing the worm shaft to oscillate and be displaced away from the worm wheel, the second of the composite metal member and the other composite metal member does not apply to the worm shaft a pressing force of an opposite direction to the one pressing force, and wherein when the second of the composite metal member and the other composite metal member applies to the worm shaft the other pressing force for causing the worm shaft to oscillate and be displaced toward the worm wheel, the first of the composite metal member and the other composite metal member does not apply to the worm shaft a pressing force of an opposite direction to the other pressing force.

6. The electric power steering device according to claim 4, wherein the holder is configured by a fixed-side holder and a displacement-side holder, wherein the fixed-side holder is formed to have a cylinder shape and is supported and fixed so that an outer peripheral surface of the fixed-side holder is internally fitted to an inner peripheral surface of the housing, wherein the displacement-side holder is formed to have a cylinder shape and is supported to a part of the worm shaft which is inserted into an inner diameter-side part of the fixed-side holder, and wherein the composite metal member and the other composite metal member are respectively held at radially opposite parts between an inner peripheral surface of the fixed-side holder and an outer peripheral surface of the displacement-side holder.

7. The electric power steering device according to claim 6 wherein a sectional shape of an inner surface of the fixed-side holder with respect to a virtual plane orthogonal to a central axis of the worm shaft is formed to have a rectangular shape, wherein a sectional shape of an outer surface of the displacement-side holder with respect to the virtual plane is formed to have a rectangular shape, wherein a pair of radially opposite inner surfaces of an inner surface of the fixed-side holder is respectively configured as a first fixed-side inner surface and a second fixed-side inner surface, wherein outer surfaces of the displacement-side holder facing the first and second fixed-side inner surfaces are configured as a first displacement-side outer surface and a second displacement-side outer surface, wherein both end portions in a width direction of the first fixed-side inner surface are formed with a pair of first fixed-side convex portions, wherein a central portion in a width direction of the second fixed-side inner surface is formed with a second fixed-side convex portion, wherein a central portion in a width direction of the first displacement-side outer surface is formed with a first displacement-side convex portion, wherein both end portions in a width direction of the second displacement-side outer surface are formed with a pair of second displacement-side convex portions, wherein in a state that the first of the composite metal member and the other composite metal member is disposed between the first fixed-side inner surface and the first displacement-side outer surface, the first of the composite metal member and the other composite metal member is disposed so that both end portions in the width direction of a side surface facing the fixed-side holder are in contact with tip surfaces of both the first fixed-side convex portions and the one of which a central portion in the width direction of a side surface facing the displacement-side holder are in contact with a tip surface of the first displacement-side convex portion, and wherein in a state that the second of the composite metal member and the other composite metal member is disposed between the second fixed-side inner surface and the second displacement-side outer surface, of the composite metal member and the other composite metal member is disposed so that a central portion in the width direction of a side surface facing the fixed-side holder is in contact with a tip surface of the second fixed-side convex portion and both end portions in the width direction of a side surface facing the displacement-side holder are in contact with tip surfaces of both the second displacement-side convex portions.

8. The electric power steering device according to claim 4, wherein the composite metal member and the other composite metal member are configured so that they are to be symmetrically deformed with respect to a central axis of the worm shaft.

9. The electric power steering device according to claim 4, wherein the composite metal member and the other composite metal member are configured so that they are to be deformed in the same direction.

* * * * *